United States Patent
Song et al.

(10) Patent No.: US 11,953,779 B2
(45) Date of Patent: Apr. 9, 2024

(54) BACKLIGHT MODULE, METHOD FOR DESIGNING THE SAME, AND DISPLAY DEVICE

(71) Applicant: BOE Technology Group Co., Ltd., Beijing (CN)

(72) Inventors: Xiaoxin Song, Beijing (CN); Feng Zhang, Beijing (CN); Wenqu Liu, Beijing (CN); Zhijun Lv, Beijing (CN); Liwen Dong, Beijing (CN); Zhao Cui, Beijing (CN); Detian Meng, Beijing (CN); Libo Wang, Beijing (CN); Dongfei Hou, Beijing (CN); Qi Yao, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/770,205

(22) PCT Filed: Jun. 8, 2021

(86) PCT No.: PCT/CN2021/098962
§ 371 (c)(1),
(2) Date: Apr. 19, 2022

(87) PCT Pub. No.: WO2022/012226
PCT Pub. Date: Jan. 20, 2022

(65) Prior Publication Data
US 2022/0373840 A1    Nov. 24, 2022

(30) Foreign Application Priority Data
Jul. 14, 2020  (CN) .......................... 202010677555.5

(51) Int. Cl.
G02F 1/00 (2006.01)
G02F 1/1335 (2006.01)
G02F 1/13357 (2006.01)

(52) U.S. Cl.
CPC .. *G02F 1/133603* (2013.01); *G02F 1/133605* (2013.01); *G02F 1/133607* (2021.01); *G02F 1/133612* (2021.01)

(58) Field of Classification Search
None
See application file for complete search history.

(56) References Cited

U.S. PATENT DOCUMENTS 7,726,828 B2   6/2010   Sato
7,819,542 B2   10/2010  Sato
(Continued)

FOREIGN PATENT DOCUMENTS

CN   101375095 A   2/2009
CN   102650383 A   8/2012
(Continued)

OTHER PUBLICATIONS

International Search Report dated Aug. 13, 2021, issued in counterpart International application No. PCT/CN2021/098962, with English translation. (5 pages).
(Continued)

*Primary Examiner* — Gerald J Sufleta, II
(74) *Attorney, Agent, or Firm* — WHDA, LLP

(57) ABSTRACT

The present disclosure relates to a backlight module, a method for designing the same, and a display device. The backlight module includes: a first substrate; a plurality of LED chips on the first substrate; and a light control structure on the first substrate. The backlight module includes a plurality of light control region groups in one-to-one correspondence with the plurality of light-emitting diode chips,
(Continued)

each light control region group includes at least a first light control region and a second light control region. The light control structure includes a plurality of light control substructure groups respectively located in the plurality of light control region groups. Each light control substructure group includes at least a first light control substructure in the first light control region and a second light control substructure in the second light control region.

16 Claims, 18 Drawing Sheets

(56) References Cited

U.S. PATENT DOCUMENTS

| | | | |
|---|---|---|---|
| 8,430,519 B2* | 4/2013 | Takata | G02F 1/133606 |
| | | | 362/97.3 |
| 9,904,105 B2* | 2/2018 | Ma | G02F 1/133606 |
| 9,939,680 B2 | 4/2018 | Cho et al. | |
| 10,072,816 B2* | 9/2018 | Shen | F21V 5/005 |
| 10,754,195 B2 | 8/2020 | Yasunaga et al. | |
| 10,871,607 B2 | 12/2020 | Yasunaga et al. | |
| 2009/0003002 A1* | 1/2009 | Sato | G02B 6/0061 |
| | | | 362/341 |
| 2010/0061096 A1* | 3/2010 | Sato | G02B 6/0061 |
| | | | 362/296.09 |
| 2012/0181436 A1 | 7/2012 | Mollov | |
| 2012/0218752 A1 | 8/2012 | Sumitani | |
| 2017/0160591 A1* | 6/2017 | Cho | G02F 1/133606 |
| 2019/0212613 A1 | 7/2019 | Yasunaga et al. | |
| 2019/0227221 A1* | 7/2019 | Yasunaga | G02B 6/0051 |
| 2020/0012154 A1 | 1/2020 | Watanabe et al. | |
| 2020/0057340 A1* | 2/2020 | Jiang | G02F 1/13338 |

FOREIGN PATENT DOCUMENTS

| | | |
|---|---|---|
| CN | 106842692 A | 6/2017 |
| CN | 208421465 U | 1/2019 |
| CN | 110031997 A | 7/2019 |
| CN | 110068956 A | 7/2019 |
| CN | 111781771 A | 10/2020 |
| IN | 110431479 A | 11/2019 |

OTHER PUBLICATIONS

Written Opinion dated Aug. 13, 2021, issued in counterpart International application No. PCT/CN2021/098962. (5 pages).

Office Action dated Mar. 24, 2022, issued in counterpart CN application No. 202010677555.5, with English translation. (23 pages).

* cited by examiner

BACKLIGHT MODULE, METHOD FOR DESIGNING THE SAME, AND DISPLAY DEVICE

CROSS REFERENCE TO RELATED APPLICATION

This application is a Section 371 National Stage Application of International Application No. PCT/CN2021/098962, filed on Jun. 8, 2021, entitled "BACKLIGHT MODULE, METHOD FOR DESIGNING THE SAME, AND DISPLAY DEVICE", which is incorporated herein by reference in its entirety which claims priority to Chinese Application No. 202010677555.5, filed on Jul. 14, 2020, incorporated herein by reference in their entirety.

TECHNICAL FIELD

The present disclosure relates to a field of display technology, and in particular, to a backlight module, a method for designing the backlight module, and a display device.

BACKGROUND

The Light Emitting Diode (LED) technology has been developed for nearly 30 years with its application range constantly expanded. For example, the Light Emitting Diode (LED) technology may be applied in the field of display as a backlight source of a display device or a LED display screen. With the development of technology, Mini Light Emitting Diode (Mini LED) has gradually become a research hotspot in the field of display technology. For example, the Mini LED may be used in a backlight module of a liquid crystal display device as a light-emitting element of the backlight module. In this way, by utilizing advantages of the Mini LED, the backlight module may achieve advantages of divisional dimming, fast response, simple structure, long life, etc.

The above information disclosed in this section is only for an understanding of the background of the inventive concepts of the present disclosure and therefore it may contain information that does not form the prior art.

SUMMARY

The present disclosure provides a signal receiving apparatus and method. A reference pulse signal in an optical pulse.

In an aspect, a backlight module is provided, including:
a first substrate;
a plurality of light emitting diode chips on the first substrate, wherein the plurality of light emitting diode chips are arranged on the first substrate in an array in a first direction and a second direction; and
a light control structure on the first substrate, wherein the light control structure is configured to: receive light emitted from the light emitting diode chips, and control a light flux distribution of light emitted from the light control structure,
wherein the backlight module includes a plurality of light control region groups, the plurality of light control region groups are in one-to-one correspondence with the plurality of light emitting diode chips, each light control region group includes at least a first light control region and a second light control region, an orthographic projection of the first light control region of each light control region group on the first substrate covers an orthographic projection of the light emitting diode chip corresponding to the light control region group on the first substrate, an orthographic projection of the second light control region of the each light control region group on the first substrate encloses the orthographic projection of the first light control region of the light control region group on the first substrate;
wherein the light control structure includes a plurality of light control substructure groups, the plurality of light control substructure groups are respectively located in the plurality of light control region groups, and each light control substructure group includes at least a first light control substructure and a second light control substructure; and
wherein each of the light control substructures includes a plurality of light transmitting portions and a plurality of light reflecting portions, and a proportion of the light transmitting portions in the first light control substructure is different from a proportion of the light transmitting portions in the second light control substructure. For example, the proportion of the light transmitting portions in the first light control substructure is a proportion of orthographic projections of all the light transmitting portions included in the first light control substructure on the first substrate to an area of the first light control region where the first light control substructure is located, and the proportion of the light transmitting portions in the second light control substructure is a proportion of orthographic projections of all the light transmitting portions included in the second light control substructure on the first substrate to an area of the second light control region where the second light control substructure is located.

According to some exemplary embodiments, the first light control substructure is located in the first light control region, the second light control substructure is located in the second light control region, and a proportion of the light transmitting portions in the first light control substructure is less than a proportion of the light transmitting portions in the second light control substructure.

According to some exemplary embodiments, the plurality of light transmitting portions and the plurality of light reflecting portions of the light control structure are arranged alternately.

According to some exemplary embodiments, the light control structure includes a light reflecting layer formed of a reflective material and a plurality of hollow portions formed in the light reflecting layer, the plurality of hollow portions are configured as the plurality of light transmitting portions, and parts of the light reflecting layer between every two adjacent hollow portions are configured as the plurality of light reflecting portions; or According to some exemplary embodiments, the plurality of light reflecting portions of the light control structure are arranged in an array in the first direction and the second direction, the light control structure includes a transparent material layer filled between every two adjacent light reflecting portions and covering the plurality of light reflecting portions, and parts of the transparent material layer between every two adjacent light reflecting portions are configured as the plurality of light transmitting portions.

According to some exemplary embodiments, the backlight module further includes: a first conductive layer on the first substrate, wherein the first conductive layer includes a plurality of first wirings;
a second conductive layer on a side of the first conductive layer away from the first substrate, wherein the second conductive layer includes a plurality of second wirings; and a first cover layer on the first substrate, wherein the first cover layer is formed of a light transmitting material, and the first cover layer is configured to fill at least gaps among the plurality of first wirings, wherein the plurality of light reflecting portions of the light control structure includes the plurality of first wirings and the plurality of second wirings, and the plurality of light transmitting portions of the light control structure include parts of the first cover layer in the gaps among the plurality of first wirings.

According to some exemplary embodiments, the first wiring extends in the first direction, the second wiring extends in the second direction, and an orthographic projection of a combination of the plurality of first wirings and the plurality of second wirings on the first substrate is in a shape of character "|囗|".

According to some exemplary embodiments, each light control region group further includes a third light control region, and an orthographic projection of the third light control region of each light control region group encloses the orthographic projection of the second light control region of the light control region group on the first substrate;

wherein each light control substructure group further includes a third light control substructure, and the third light control substructure is located in the third light control region;

wherein the third light control substructure further includes a plurality of light transmitting portions and a plurality of light reflecting portions, a proportion of the light transmitting portions in the third light control substructure, the proportion of the light transmitting portions in the second light control substructure and the proportion of the light transmitting portions in the first light control substructure are different from each other, the proportion of the light transmitting portions in the third light control substructure is a proportion of orthographic projections of all the light transmitting portions included in the third light control substructure on the first substrate to an area of the third light control region where the third light control substructure is located.

According to some exemplary embodiments, each light control region group further includes a fourth light control region, and an orthographic projection of the fourth light control region of each light control region group on the first substrate encloses the orthographic projection of the third light control region of the light control region group on the first substrate;

wherein each light control substructure group further includes a fourth light control substructure, and the fourth light control substructure is located in the fourth light control region;

wherein the fourth light control substructure further includes a plurality of light transmitting portions and a plurality of light reflecting portions, a proportion of the light transmitting portions in the fourth light control substructure, the proportion of the light transmitting portions in the third light control substructure, the proportion of the light transmitting portions in the second light control substructure and the proportion of the light transmitting portions in the first light control substructure are all different from each other, and the proportion of the light transmitting portions in the fourth light control substructure is a proportion of orthographic projections of all the light transmitting portions included in the fourth light control substructure on the first substrate to an area of the fourth light control region where the fourth light control substructure is located.

According to some exemplary embodiments, each light control region group includes N light control regions, and N is a positive integer greater than or equal to 2;

wherein the N light control regions include at least the first light control region and the second light control region, and an orthographic projection of a Nth light control region of each light control region group on the first substrate encloses an orthographic projection of a N-1th light control region of the light control region group on the first substrate.

According to some exemplary embodiments, the backlight module further includes a plurality of light diffusing structures on the first substrate, wherein orthographic projections of the plurality of light diffusing structures on the first substrate respectively cover orthographic projections of the plurality of light emitting diode chips on the first substrate, and the light diffusing structure is configured to diffuse the light emitted from the light emitting diode chip.

According to some exemplary embodiments, each light diffusing structure includes a plurality of triangular prisms, each triangular prism has an apex angle and an edge opposite to the apex angle, the edge of the triangular prism is located on a side of the triangular prism close to the first substrate, and the apex angle is located on a side of the triangular prism away from the first substrate.

According to some exemplary embodiments, the backlight module further includes a first planarization layer on the first substrate, wherein the first planarization layer covers the plurality of triangular prisms, and a refractive index of a material of the first planarization layer is greater than a refractive index of a material of the light diffusing structure.

According to some exemplary embodiments, the first substrate includes a first side and a second side opposite to the first side, and the plurality of light emitting diode chips and the light control structure are respectively located on the first side and the second side of the first substrate;

wherein the plurality of light diffusing structures are disposed on the first side of the first substrate and between the first substrate and the plurality of light emitting diode chips.

According to some exemplary embodiments, the first substrate includes a first side and a second side opposite to the first side, and each of the plurality of light emitting diode chips and the light control structure is located on the first side of the first substrate;

wherein the backlight module further includes a first reflective layer on the first substrate, and the first reflective layer is disposed between the first conductive layer and the first substrate;

wherein an orthographic projection of the first reflective layer on the first substrate covers an orthographic projection of the first wirings on the first substrate, and the orthographic projection of the first reflective layer on the first substrate further covers an orthographic projection of the second wirings on the first substrate.

According to some exemplary embodiments, the backlight module further includes a second reflective layer on the first substrate, and the second reflective layer is located on a side of a second cover layer away from the first substrate;

wherein an orthographic projection of the second reflective layer on the first substrate at least partially overlaps with the orthographic projection of the first wirings on the first substrate, and the orthographic projection of the second reflective layer on the first substrate at least partially overlaps with the orthographic projection of the second wirings on the first substrate, and the orthographic projection of the second reflective layer on the first substrate is in a shape of character "回".

According to some exemplary embodiments, the backlight module further includes an encapsulating layer and a reflective structure, wherein the encapsulating layer is disposed on the first substrate and covers the plurality of light emitting diode chips, the reflective structure is located on a side of the encapsulating layer away from the first substrate, and an orthographic projection of the reflective structure on the first substrate at least covers an orthographic projection of the plurality of light emitting diode chips on the first substrate.

According to some exemplary embodiments, the reflective structure includes a plurality of lenses, the plurality of lenses are arranged on the first substrate in an array, and each lens is protruded in a direction away from the first substrate.

According to some exemplary embodiments, the reflective structure includes a groove portion, and an orthographic projection of the groove portion on the first substrate at least partially overlaps with the orthographic projection of the plurality of light emitting diode chips on the first substrate, and the groove portion is recessed in a direction toward the light emitting diode chips.

According to some exemplary embodiments, the backlight module further includes an encapsulating layer and a reflective structure, wherein the encapsulating layer is disposed on the first substrate and covers the plurality of light emitting diode chips, the reflective structure is located on the second side of the first substrate, and an orthographic projection of the reflective structure on the first substrate at least covers an orthographic projection of the plurality of light emitting diode chips on the first substrate.

According to some exemplary embodiments, the light emitting diode chip is a Mini-LED chip In another aspect, a display device is provided, including the backlight module described above.

In yet another aspect, a method for designing a backlight module is provided, including:

acquiring parameters of a light emitting diode chip, wherein the parameters includes at least a size of the light emitting diode chip, a light flux a light-emitting angle of light emitted from the light emitting diode chip;

determining an upper limit of the number of reflections of the light emitted from the light emitting diode chip;

determining a period value of each light control region and a period value of a light emitting diode chip array based on the parameters of the light emitting diode chip, a thickness of a first substrate and the determined upper limit of the number of reflections, wherein the period value of the light emitting diode chip array is a center distance between two adjacent light emitting diode chips;

determining a light transmittance and a light reflectivity of each light control region; and designing a light control structure in each light control region based on the determined light transmittance of each light control region.

BRIEF DESCRIPTION OF DRAWINGS

Other purposes and advantages of the present disclosure will become apparent through the descriptions of the present disclosure with reference to the drawings, which may facilitate a better understanding of the present disclosure.

Figure 1:
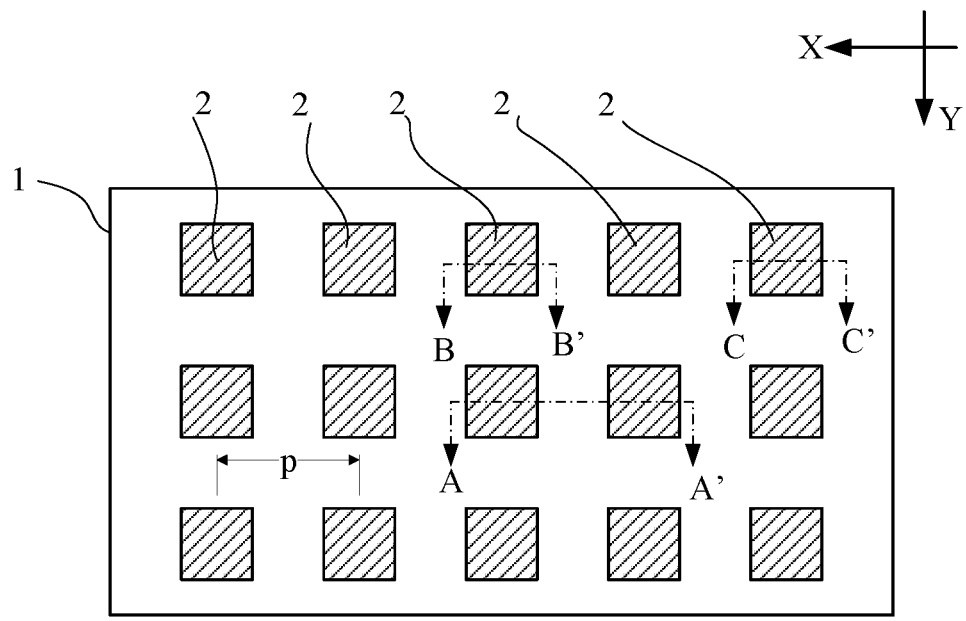
FIG. 1 is a schematic plan view of a backlight module according to some embodiments of the present disclosure.

It should be noted that, in the drawings for describing the embodiments of the present disclosure, sizes of layers, structures or regions may be enlarged or reduced for clarity, ie, the drawings are not drawn to actual scale.

DETAILED DESCRIPTION

In the following descriptions, for purpose of explanation, various specific details are set forth to provide a thorough understanding of various exemplary embodiments. However, it is apparent that various exemplary embodiments may be implemented without these specific details or with one or more equivalent arrangements. In other instances, well-known structures and devices are shown in forms of block diagrams to avoid unnecessarily obscuring the various exemplary embodiments. Furthermore, the various exemplary embodiments may vary, but are not necessarily exclusive. For example, specific shapes, configurations, and characteristics of an exemplary embodiment may be used or implemented in another exemplary embodiment without departing from the inventive concept.

In the drawings, sizes and relative sizes of elements may be enlarged for clarity and/or descriptive purposes. In this way, the sizes and relative sizes of the various elements are not necessarily limited to those shown in the drawings. When the exemplary embodiments may be implemented differently in a specific process sequence differently from a described sequence. For example, two consecutively described processes may be performed substantially simultaneously or in a reverse sequence of the described sequence. Furthermore, the same reference numerals refer to the same elements.

When an element is described as being "on," "connected to," or "coupled to" another element, the element may be directly on, directly connected to, or directly coupled to the another element, or an intervening element may be present. However, when an element is described as being "directly on," "directly connected to," or "directly coupled to" another element, no intervening element is present. Other terms and/or expressions used to describe a relationship between elements should be interpreted in a similar manner. For example, "between" and "directly between", "adjacent" and "directly adjacent", "or "on" and "directly on", etc. Furthermore, the term "connected" may refer to a physical connection, an electrical connection, a communication connection, and/or a fluid connection. In addition, an X axis, a Y axis and a Z axis are not limited to three axes of a rectangular coordinate system, and may be interpreted in a broader sense. For example, the X axis, the Y axis, and the Z axis may be perpendicular to each other, or may represent different directions that are not perpendicular to each other. For the purpose of this disclosure, "at least one of X, Y, and Z" and "at least one selected from a group consisting of X, Y, and Z" may be interpreted as X only, Y only, Z only, or any combination of two or more of X, Y and Z such as XYZ, XY, YZ and XZ. As used herein, the term "and/or" includes any and all combinations of one or more of associated listed items.

It should be understood that, although terms "first", "second", etc. may be used herein to describe different elements, these elements should not be limited by these terms. These terms are only used to distinguish one element from another. For example, without departing from the scope of exemplary embodiments, a first element may be referred to as a second element, similarly, a second element may be referred to as a first element.

Herein, an inorganic LED refers to a light emitting element made of an inorganic material, wherein the LED means an inorganic light emitting element different from an OLED. Specifically, the inorganic LED may include a Mini Light Emitting Diode (Mini LED in short) and a Micro Light Emitting Diode (Micro LED in short). The Mini Light Emitting Diode (ie Mini LED) refers to a small light emitting diode with a grain size between a Micro LED and a traditional LED. Generally, the grain size of the Mini LED may be between 100 and 300 microns.

Herein, the expression "light control structure" means that a structure may control light incident thereon such that an energy distribution or light flux distribution of light emitted from the structure meets a predetermined requirement. The expression "light control region" means that an energy distribution or a light flux distribution of light emitted in the region is required to be controlled to meet a predetermined requirement.

Some exemplary embodiments of the present disclosure provide a backlight module, a method for designing the backlight module, and a display device. The backlight module includes: a first substrate; a plurality of light emitting diode chips on the first substrate, the plurality of light emitting diode chips are arranged on the first substrate in an array in a first direction and a second direction; and a light control structure disposed on the first substrate, the light control structure is configured to: receive light emitted from the light emitting diode chip, and control a light flux distribution of light emitted from the light control structure. The backlight module includes a plurality of light control region groups, the plurality of light control region groups are in a one-to-one correspondence with the plurality of light emitting diode chips, and each light control region group includes at least a first light control region and a second light control region, an orthographic projection of the first light control region of each light control region group on the first substrate covers an orthographic projection of the light emitting diode chip corresponding to the light control region group on the first substrate, and an orthographic projection of the second light control region of the each light control region on the first substrate encloses the orthographic projection of the first light control region of the light control region group on the first substrate; the light control structure includes a plurality of light control substructure groups, the plurality of light control substructure groups are respectively located in the plurality of light control region groups, each light control substructure group includes at least a first light control substructure and a second light control substructure; and each light control substructure includes a plurality of light transmitting portions and a plurality of light reflecting portions, and a proportion of the light transmitting portions in the first light control substructure is different from a proportion of the light transmitting portions in the second light control substructure. In this way, the light flux of the light emitted from each light control region may be substantially consistent, that is, a uniformity of the backlight module may be improved.

Figure 2:
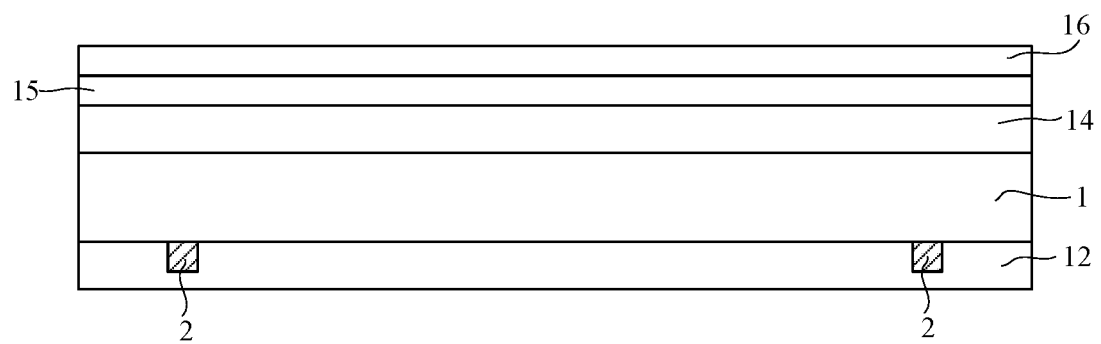
FIG. 2 is a cross-sectional view of the backlight module taken long line A-A' in FIG. 1 according to some embodiments of the present disclosure.

FIG. 1 is a schematic plan view of a backlight module according to some exemplary embodiments of the present disclosure, and FIG. 2 is a cross-sectional view of the backlight module taken along line AA' in FIG. 1 according to some exemplary embodiments of the present disclosure. Referring to FIGS. 1 and 2, the backlight module according to the embodiments of the present disclosure may include a first substrate 1 and an LED chip array disposed on the first substrate 1. For example, the first substrate 1 may be a glass substrate, and the LED chip array may include a plurality of LED chips 2. During actual manufacturing, after wirings are formed on the glass substrate 1, the plurality of LED chips 2 are arranged in an array on the first substrate 1 through picking and placing (for example, surface mounting, etc.). FIG. 1 schematically shows that the plurality of LED chips 2 are arranged in an array in a first direction X and a second direction Y on the first substrate 1.

For example, the first direction X and the second direction Y are perpendicular to each other, and a third direction Z is perpendicular to each of the first direction X and the second direction Y.

In some exemplary embodiments of the present disclosure, the LED chip 2 may be a Mini LED chip. The Mini LED may be driven by a thin film transistor like an active matrix, or may be driven by a driver IC like a passive matrix. For example, an LED backlight source may be driven by a driver IC. Specifically, the Mini LED backlight module may be applied to an LCD display panel to form a display screen. In the display screen, the Mini LED backlight module may be divided into hundreds to tens of thousands of regions according to requirements, each region may correspond to a plurality of pixel points in the display panel, and a brightness of each region may be controlled independently. In this way, a light-dark contrast ratio of the display screen may be increased to 10,000,000:1, which is the same as that of the OLED. For a dark region of an image, the Mini LED may be set to be in an off state. If the image such as a firework is required to be particularly bright, the brightness of the Mini LED in this region may be increased. Through such sub-regional control, not only the light-dark contrast may be greatly improved, power may also be saved.

It should be noted that a rectangular frame is used to represent the LED chip in FIG. 1. However, it should be understood that the LED chip in the embodiments of the present disclosure is not limited to being a rectangle, and may be other shapes such as a circle, a polygon, etc.

Since light emitted from each LED chip 2 has a Lambertian distribution, a pitch value of the LED chip array and a light control region of each LED chip 2 are required to be designed to ensure that the uniformity of the light emitted from the entire backlight module meets the requirement.

Herein, the expression "the pitch value of the LED chip array or the LED chip" is also referred to as a period value of the LED chip array or the LED chip, indicated by a reference numeral p in FIGS. 1 and 2, representing a distance between centers of two adjacent LED chips in the LED chip array.

Figure 3:
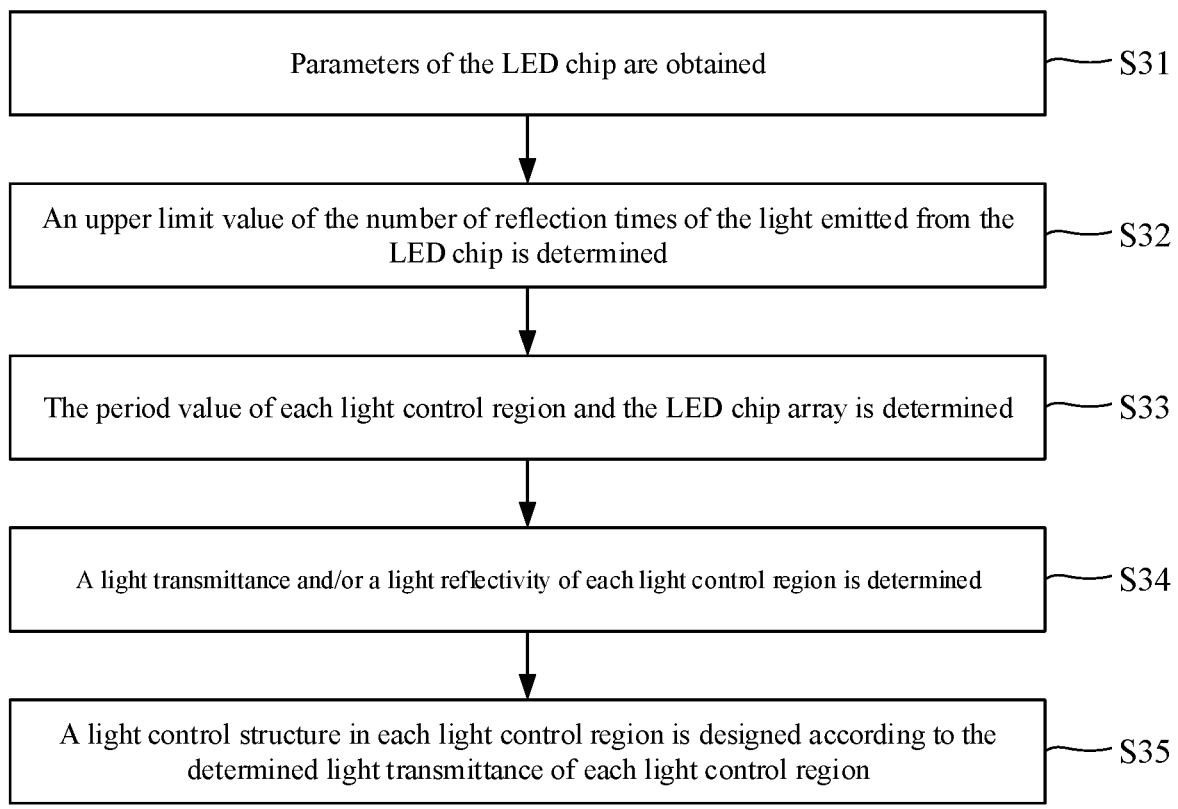
FIG. 3 is a partial flowchart of a method for designing a backlight module according to some embodiments of the present disclosure.

FIG. 3 is a partial flowchart of a method for designing a backlight module according to some exemplary embodiments of the present disclosure. Hereinafter, the method for designing the backlight module according to some exemplary embodiments of the present disclosure will be described with reference to FIGS. 1 to 3.

In step S31, parameters of the LED chip are acquired. For example, the parameters may include the light flux of the light emitted from the LED chip, the light emitting angle, etc. After a model of the LED chip is selected, the parameters are all determined values.

In step S32, an upper limit value of the number of reflections of the light emitted from the LED chip is determined.

Figure 4:
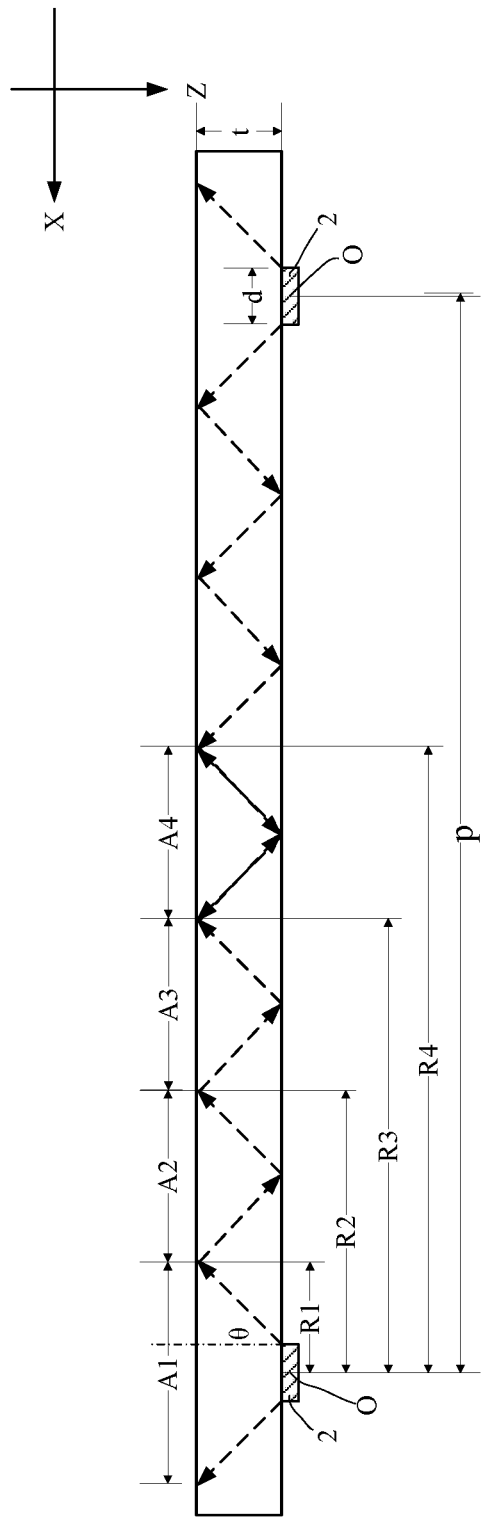
FIG. 4 schematically shows an reflection light path diagram of light emitted from a LED chip in a glass substrate.

FIG. 4 schematically shows a reflection light path diagram of the light emitted from the LED chip in the glass substrate. Referring to FIG. 2 and FIG. 4, a part of the light emitted from the LED chip may be emitted from a front surface (ie, in a direction perpendicular to the first substrate 1), and this part of the light may be emitted directly without being reflected in the first substrate 1. Another part of the light emitted from the LED chip is emitted after being reflected a plurality of times in the first substrate 1. The longer the light transmits, the more the number of reflections, and the lower a light efficiency of the light final emitted. That is, in a process of light transmission and reflection, loss of light may be occurred. The loss of the light is related to a material through which the light is transmitted and reflected.

In the embodiments of the present disclosure, the first substrate 1 is a glass substrate, that is, the light is mainly transmitted and reflected in the glass. In the step, according to parameters of the first substrate 1 (including parameters such as a material of the first substrate 1 and a thickness of the first substrate 1, etc.), the light loss of the light after each reflection may be calculated, so as to determine the number of reflections of the light emitted from the LED chip. For example, FIG. 4 schematically shows a case in which the light emitted from an LED chip is reflected by 6 times (including three reflections on an upper surface and three reflections on a lower surface). Since the loss of light may be large after being reflected by more times (for example, 8 times), this part of the light may be ignored. That is to say, during designing, the light reflected within 6 times may be mainly considered.

In step S33, a period value of each light control region and a period value of a LED chip array are determined.

Each light control region may be determined according to a light emitting angle, a chip size, a thickness of the first substrate 1 of the LED chip and the number of reflections determined in the step S32. Referring to FIG. 4, four light control regions are schematically shown. For ease of description, the four light control regions are respectively referred to as a first light control region, a second light control region, a third light control region and a fourth light control region, denoted by reference numerals A1, A2, A3 and A4, respectively. In the first light control region A1, the light emitted from the LED chip 2 is emitted after being reflected 0 times, that is, the light emitted from the LED chip 2 is directly emitted. In the second light control region A2, the light emitted from the LED chip 2 is emitted after being reflected two times (one reflection on the upper surface and one reflection on the lower surface). In the third light control region A3, the light emitted from the LED chip 2 is emitted after being reflected four times (two reflections on the upper surface and two reflections on the lower surface). In the fourth light control region A4, the light emitted from the LED chip 2 is emitted after being reflected 6 times (three reflections on the upper surface and three reflections on the lower surface). As mentioned above, since the light will be lost after being reflected, theoretically, for the light emitted from a single LED chip 2, energies of the light emitted from the first light control region A1, the second light control region A2, the third light control region A3 and the fourth light control region A4 are different. Specifically, the energy of the light emitted from the first light control region A1 is greater than that of the light emitted from the second light control region A2, and the energy of the light emitted from the second light control region A2 is greater than that of the third light control region A3, the energy of the light emitted from the third light control region A3 is greater than the energy of the light emitted from the fourth light control region A4.

For example, a shape of an orthographic projection of each one of the first light control region A1, the second light control region A2, the third light control region A3 and the fourth light control region A4 on the first substrate 1 is a circle or a annulus, however, the embodiments of the present disclosure are not limited to the shapes of circle and annulus. In this case, the orthographic projection of the first light control region A1 on the first substrate 1 has a center O, which coincides with an orthographic projection of a center of the LED chip 2 on the first substrate 1. Sizes of the first light control region A1, the second light control region A2, the third light control region A3 and the fourth light control region A4 may be respectively represented by radiuses of the respective orthographic projections (circles) thereof.

Figure 5:
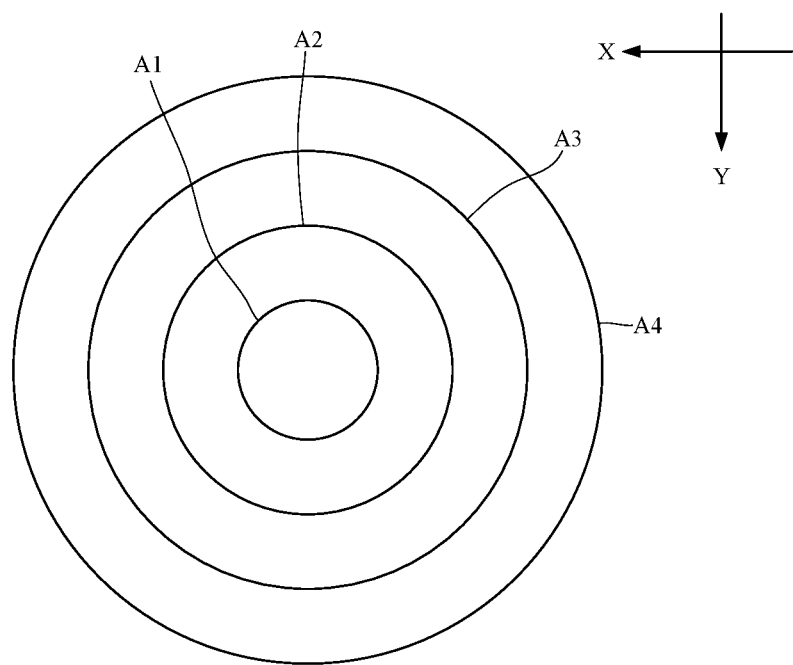
FIG. 5 schematically shows a plan view of each light control region.

FIG. 5 schematically shows a plan view of the various light control regions. As shown in FIGS. 4 and 5, the first light control region A1, the second light control region A2, the third light control region A3 and the fourth light control region A4 may have a first radius R1, a second radius R2, a third radius R3 and a fourth radius R4, respectively. It should be understood that an region of the orthographic projection of the first light control region A1 on the first substrate 1 is a circular region with the center O as the center and the first radius R1 as the radius, and an region of the orthographic projection of the second light control region A2 is an annular region obtained by subtracting the circular region with the center O as the center and the first radius R1 as the radius from a circular region with the center O as the center and the second radius R2 as the radius, an region of the orthographic projection of the light control region A3 on the first substrate 1 is an annular region obtained by subtracting the circular region with the center O as the center and the first radius R2 as the radius from a circular region with the center O as the center and the third radius R3 as the radius, and an region of the orthographic projection of the fourth light control region A4 on the first substrate 1 is an annular region obtained by subtracting the circular region with the center O as the center and the third radius R3 as the radius from a circular region with the center O as the center and the fourth radius R4 as the radius.

In the step S33, the light emitting angle θ of the LED chip may be obtained, and the size of the LED chip (ie, a diameter of the LED chip) is d. In addition, the thickness t of the first substrate 1 may also be obtained. Values of the first radius R1, the second radius R2, the third radius R3 and the fourth radius R4 may be respectively calculated according to the following formulas:

$$R1 = t * \tan θ + 0.5 * d \quad (1)$$

$$R2 = 3 * t * \tan θ + 0.5 * d \quad (2)$$

$$R3 = 5 * t * \tan θ + 0.5 * d \quad (3)$$

$$R4 = 7 * t * \tan θ + 0.5 * d \quad (4)$$

For example, the light emitting angle θ of the LED chip may be about 41 degrees, and the size d of the LED chip may be about 100 microns. That is, the radius of the LED chip (a distance from an edge thereof to the center O) may be 50 microns. In addition, the thickness t of the first substrate 1 may be about 0.5 mm. so that the values of the first radius R1, the second radius R2, the third radius R3 and the fourth radius R4 may be respectively calculated according to the following formulas:

$$R1 = 0.5 * \tan θ + 0.05 = 0.485 \text{ mm} \quad (1)$$

$$R2 = 3 * 0.5 * \tan θ + 0.05 = 1.355 \text{ mm} \quad (2)$$

$$R3 = 5 * 0.5 * \tan θ + 0.05 = 2.225 \text{ mm} \quad (3)$$

$$R4 = 7 * 0.5 * \tan θ + 0.05 = 3.095 \text{ mm} \quad (4)$$

As mentioned above, after a plurality of reflections, the loss of the light emitted from the LED chip is large. Therefore, in the exemplary embodiment shown in FIG. 4, the light emitted from two adjacent LED chips 2 is mixed in the fourth light control region A4. That is, the fourth light control regions A4 of the two adjacent LED chips 2 are overlapped. In this way, a distance between the centers O of the two adjacent LED chips 2 (that is, the period value or pitch value of the LED chip array) may be calculated, and the following calculation may be performed with reference to FIG. 4:

$$p = 12 * t * \tan θ + d \quad (5)$$

For example, in the example mentioned above, $p = 12 * 0.5 * \tan θ + 0.1 = 5.32$ mm.

In step S34, a light transmittance and/or a light reflectivity of each light control region is determined.

Herein, the expression "light transmittance of the light control region" means a proportion of light emitted after being incident on the light control region, to the light incident on the light control region, and the expression "light reflectivity of the light control region" means a proportion of the light reflected after being incident on the light control region to the light incident on the light control region.

Specifically, for a specific type of LED chip, a light flux of emitted light thereof is known. That is, a total light flux of light incident on each light control region is known. In this way, the light flux of the light incident on each of the light control regions A1, A2, A3 and A4 may be calculated. According to the light flux of the light incident on each of the light control regions A1, A2, A3 and A4, and taking into consideration areas of each of the light control regions A1, A2, A3 and A4, the light transmittance and the light reflectivity of each of the light control regions A1, A2, A3 and A4 may be calculated.

For example, in the above exemplary embodiment, the light transmittance and the light reflectivity of each of the light control regions may be determined, as shown in the following table.

TABLE 1

Example of light transmittance and light reflectivity of each light control region

| Light control region | A1 | A2 | A3 | A4 |
|---|---|---|---|---|
| Light transmittance | 22.56% | 29.13% | 26.94% | 28.12% |
| Light reflectivity | 77.44% | 70.87% | 73.06% | 71.88% |

It should be seen from the above table that the light transmittance of the first light control region A1 is the smallest, the light transmittance of the second light control region A2 is the largest, and the light transmittances of the third light control region A3 and the fourth light control region A4 are between the first light control region A1 and the second light control region A2. It should be understood that a light flux of light emitted from a light control region is affected by a light flux of light incident in the light control region, an area of the light control region and the light transmittance of the light control region. In the embodiments of the present disclosure, since the light flux of the light incident on the first light control region A1 is the largest, the light transmittance of the first light control region A1 is the smallest; the light fluxes of the light incident in the third light control region A3 and the fourth light in the control area A4 are small, however, since an area of each of the third light control region A3 and the fourth light control region A4 is relatively large, in general, the light transmittance of the third light control region A3 and the fourth light control region A4 may be set to be higher than the light transmittance of the first light control region A1, but smaller than the light transmittance of the second light control region A2.

In the step, the respective light transmittances are designed for each light control region, so that the light flux of the light emitted from each light control region may be substantially consistent, that is, the uniformity of the backlight module may be improved.

In step S35, a light control structure in each light control region is designed according to the determined light transmittance of each light control region.

The light control structure may be disposed on a light emitting side of each LED chip 2, and the light control structures in the various light control regions may be different, so that the light transmittance of each light control region is matched with the light transmittance determined in the above step S34.

Figure 6A:
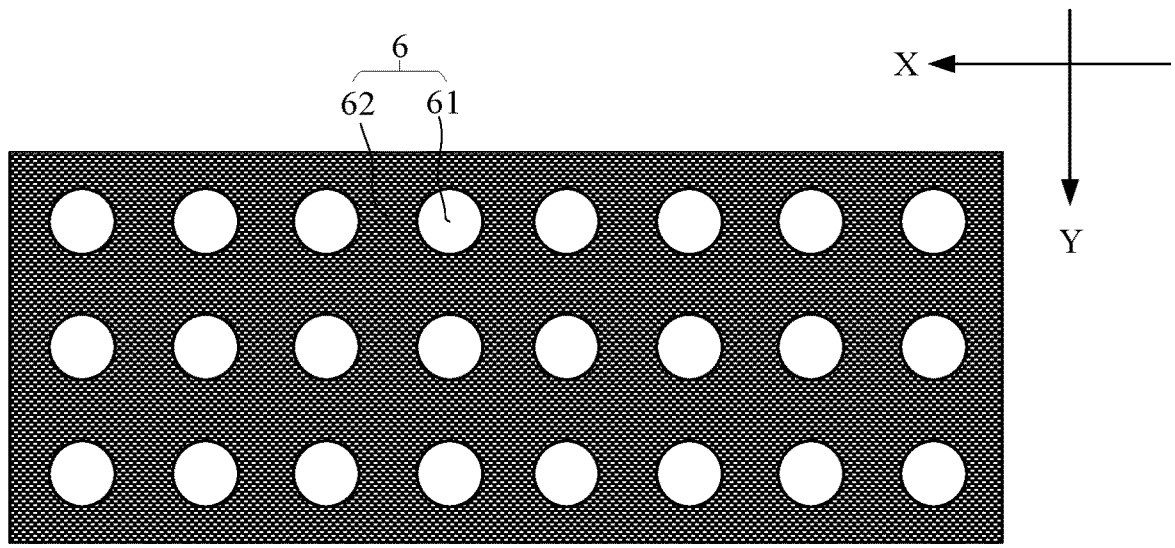
FIGS. 6A and 6B are schematic structural diagrams of an individual light control structure included in a backlight module according to some exemplary embodiments of the present disclosure.
Figure 6B:
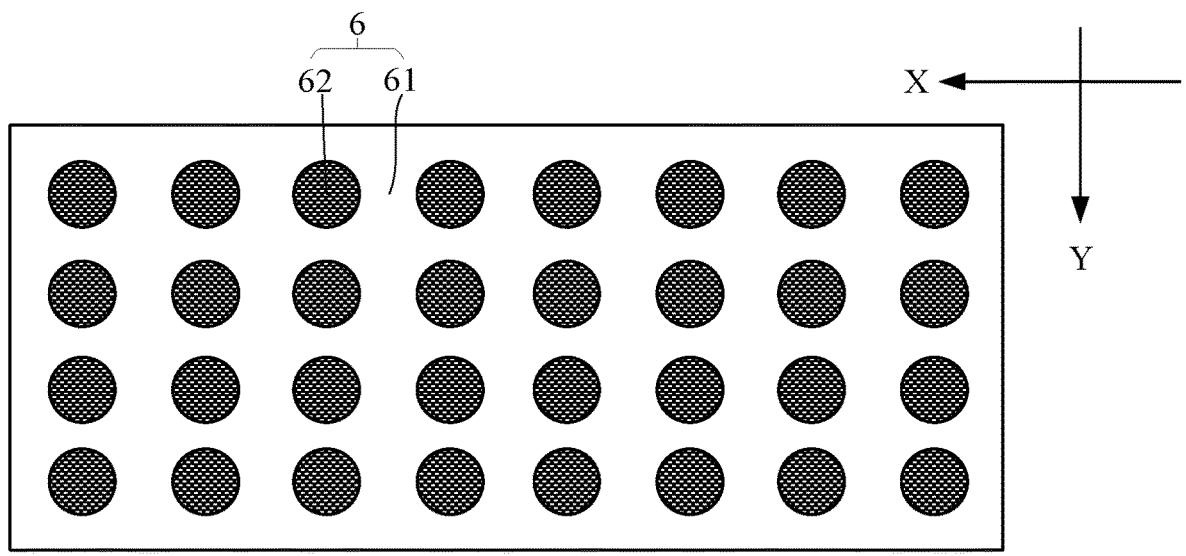

In some optional embodiments, an individual light control structure may be disposed on the light emitting side of each LED chip 2. FIGS. 6A and 6B are schematic structural diagrams of an individual light control structure included in a backlight module according to some exemplary embodiments of the present disclosure. As shown in FIGS. 6A and 6B, the light control structure 6 may include a plurality of light transmitting portions 61 and a plurality of light reflecting portions 62. The light may be transmitted through the light transmitting portion 61 when being incident on the light transmitting portion 61; and the light may be reflected by the light reflecting portion 62 when being incident on the light reflecting portion 62.

For example, as shown in FIG. 6A, a layer of a light reflecting material (or a layer of an opaque material) may be formed first, and then a plurality of light transmitting holes or hollow portions may be formed in the layer of the light reflecting material. For example, a patterning process may be used to form the plurality of light transmitting holes or hollow portions, the light transmitting holes or hollow portions are used to form the light transmitting portions 61. The plurality of light transmitting portions 61 are arranged at intervals in an array in the layer of the light reflecting material. In this way, a part of the layer of the light reflecting material between adjacent light transmitting portions 61 is used to form the light reflecting portion 62. In this case, the light transmitting portion 61 formed through the patterning process may be referred to as a light control microstructure.

For another example, as shown in FIG. 6B, a layer of a light reflecting material (or an opaque material layer) may be formed, and then a plurality of reflective patterns arranged at intervals in an array are formed through a patterning process, and the reflective patterns are used to form the reflective portions 62. Gaps between the plurality of light reflecting portions 62 are used form the light transmitting portions 61. Optionally, a transparent material may also be filled among the plurality of reflective patterns 62, and a transparent material portion located among the plurality of reflective patterns 62 is used to form the light transmitting portion 61. In this case, the reflecting portions 62 formed through the patterning process may be referred to as a light control microstructure.

That is, the light control structure 6 may include a plurality of light transmitting portions 61 and a plurality of light reflecting portions 62. In the first direction X, the plurality of light transmitting portions 61 and the plurality of light reflecting portions 62 are arranged alternately, that is, a light reflecting portion 62 is disposed between two adjacent light transmitting portions 61, and a light reflecting portion 62 is disposed between two adjacent light transmitting portions 62. In the second direction Y, the plurality of light transmitting portions 61 and the plurality of light reflecting portions 62 are alternately arranged, that is, a light reflecting portion 62 is disposed between two adjacent light transmitting portions 61, and a light transmitting portion 61 is arranged between two adjacent light reflecting portions 62.

It should be noted that although orthographic projections of the light transmitting portions 61 in FIG. 6A and the light reflecting portions 62 in FIG. 6B in the XY plane are shown as circles, the embodiments of the present disclosure are not limited to this. Shapes of the orthographic projections of the light transmitting portions 61 in FIG. 6A and the light reflecting portion 62 in FIG. 6B in the XY plane may be any suitable shape, such as a rectangle, a rounded rectangle, an ellipse, etc.

In this case, the above step S35 may further include the following steps: S351. proportions of the light transmitting portions 61 and the light reflecting portions 62 included in the light control structure in each light control region is determined based on the light transmittance of each light control region; S352. a size of the light control microstructure included in the light control structure in each light control region is determined according to the determined proportions of the light transmitting portion 61 and the light reflecting portion 62.

Referring to FIGS. 4 and 5 and the Table 1 above, in the step S351, it may be determined that: for the light control structure in the first light control region A1, the area of the orthographic projection of the light transmitting portions 61 in the XY plane is 22.56% of a total area of the first light control region A1, the area of the orthographic projection area of the light reflecting portion 62 in the XY plane is 77.44% of the total area of the first light control region A1; for the light control structure in the second light control region A2, the area of the orthographic projection of the light-transmitting portions 61 in the XY plane is 29.13% of a total area of the second light control region A2, and the area of the orthographic projection of the reflective portions 62 in the XY plane is 70.87% of the total area of the second light control region A2; for the light control structure in the third light control region A3, the area of the orthographic projection of the light transmitting portions 61 in the XY plane is 26.94% of the total area of the third light control region A3, and the area of the orthographic projection of the light reflecting portions 62 is 73.06% of the total area of the third light control region A3; for the light control structure in the fourth light control region A4, the area of the orthographic projection of the light transmitting portions 61 in the XY plane is 28.12% of a total area of the fourth light control region A4, and the area of the orthographic projection of the light reflecting portions 62 in the XY plane is 71.88% of the total area of the fourth light control region A4.

In the step S352, the size of the light control microstructure in each light control region may be determined according to the above proportion. For example, as shown in FIG. 6A, the size here may include a diameter of each light control microstructure 61 and a center distance between two adjacent light control microstructures 61 (the center distance may also be referred to as the pitch value or the period value of the light control microstructure); as shown in FIG. 6B, the size here may include a diameter of each light control microstructure 62 and a center distance between two adjacent light control microstructures 62 (the center distance may also be referred to as the pitch value or the period value of the light control microstructure).

It should be noted that, in step S352, factors of actual manufacturing processes may need to be considered. Since each light control microstructure 62 is formed through a patterning process by means of a mask, a resolution limitation of the mask manufacturing process is required to be considered.

As mentioned above, since the light transmittance of each light control region is different, a distribution density of the light control microstructures in each light control region should be different. Specifically, for the embodiment shown in FIG. 6B, the distribution density of the light control microstructures 62 in the first light control region A1 is the largest, the distribution density of the light control microstructures 62 in the second light control region A2 is the smallest, and the distribution densities of the light control microstructures 62 in the third light control region A3 and the fourth light control region A4 are between the distribution density of the structures 62 in the first light control region A1 and the distribution density of the structures 62 in the second light control region A2.

Herein, the expression "distribution density" refers to a distribution number of certain structures, components, elements or parts per unit area, which may indicate a sparse degree of the distribution of the structures, components, elements or parts in a certain region.

Optionally, for ease of processing, diameters of the light control microstructures in each light control region may be the same. At this time, for different distribution densities of the light control microstructures in each light control region, the pitch values of the light control microstructures in each light control region may be designed to be different. The point will be described in more detail below in conjunction with the drawings.

In some optional embodiments, the light control structure may be formed by using wirings disposed on the light emitting side of each LED chip 2.

Herein, the expression "wiring" may include wirings formed of a conductive material, generally an opaque material, such as a metal conductive material such as Cu. For example, the wirings may be electrically connected to electrodes of each LED chip 2 for providing electrical signals to each LED chip 2.

Figure 6C:
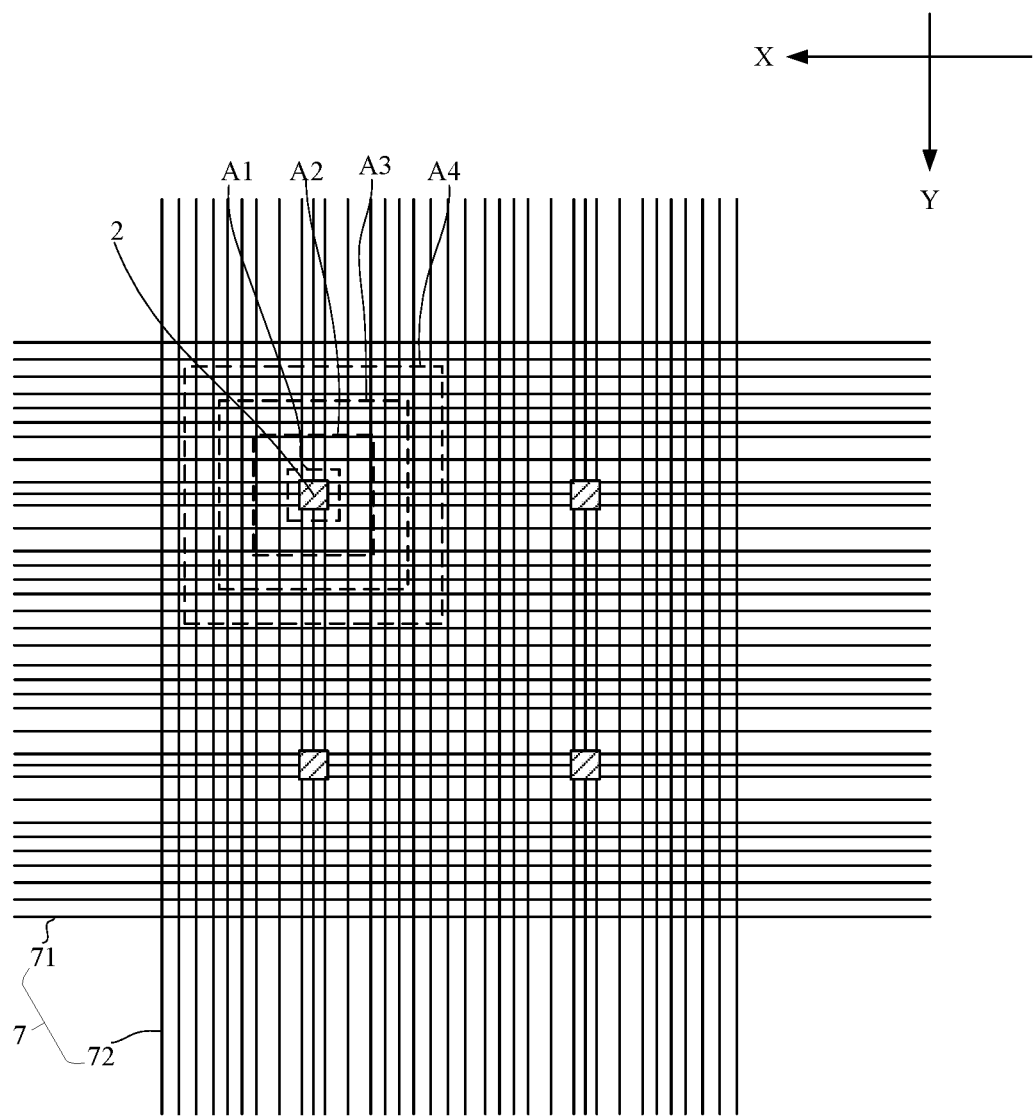
FIG. 6C is a schematic structural diagram of a light control structure formed by wirings included in a backlight module according to some exemplary embodiments of the present disclosure.

FIG. 6C is a schematic structural diagram of a light control structure formed by wirings included in a backlight module according to some exemplary embodiments of the present disclosure. As shown in FIG. 6C, a plurality of wirings 7 are disposed on the light emitting side of each LED chip 2, and the plurality of wirings 7 are arranged at intervals. Since the wirings are formed of the opaque material, parts of the wirings 7 in each light control regions may be used to form the light reflecting portions 62 of the light control structure, and gaps among the wirings 7 may be used to form the light transmitting portions 61 of the light control structure.

In this case, the above step S35 may further include the following steps: S351. a wiring mode may be determined according to the light transmittance of each light control region; S352. sizes of the wirings in each optical control region may be determined according to the determined wiring mode.

For example, as shown in FIG. 6C, in step S351, according to the light transmittance of each light control region, the wiring mode may be determined as a wiring mode of a shape of character " 囬 ". That is, a part of the wirings 7 extends in the first direction X, and the other part of the wirings 7 extends in the second direction Y. For ease of description, the wiring extending in the first direction X may be referred to as a first wiring 71, and the wiring 7 extending in the second direction Y may be referred to as a second wiring 72.

In this way, projections of the first wirings 71 and the second wirings 72 on the XY plane form the shape of character " 囬 ".

In step S352, sizes of the wirings 7 in each of the light control regions A1, A2, A3 and A4 may be determined. The sizes here may include a line width of each wiring, and spacing between every two adjacent wirings (hereinafter referred to as wiring spacing).

It should be noted that, in step S352, the factors of the actual manufacturing processing may also need to be considered.

As mentioned above, since the light transmittance of each light control region is different, the sizes of the wirings in each light control region should be different. For ease of manufacturing, the line widths of the wirings in each light control region may be the same. At this time, the wiring spacing in each light control region may be designed to be different, so as to achieve different light transmittances in different light control region.

Specifically, for the embodiment shown in FIG. 6C, the wiring spacing in the first optical control region A1 may be the smallest, the wiring spacing in the second optical control region A2 may be the largest, and the wiring spacing in the third optical control region A3 and the wiring spacing in the fourth optical control region may be between the wiring spacing in the first light control region A1 and the wiring spacing in the second light control region A2.

It should also be noted that, in some optional embodiments, the line widths of the wirings extending through each light control region may also be different. For example, the line widths of the wirings extending through the first light control region A1 may be set larger to achieve a greater light reflectivity in the first light control region A1; the line widths of the wirings extending through the second light control region A2 is set smaller to achieve a smaller light reflectivity in the second light control region A2. That is, the line widths of the wirings extending through the first light control region A1 may be larger than the line widths of the wirings extending through the second light control region A2.

Hereinafter, the backlight module according to some exemplary embodiments of the present disclosure will be further described with reference to the drawings. It should be noted that, the backlight module may be designed and manufactured according to the above-mentioned method or principle of designing.

Figure 7:
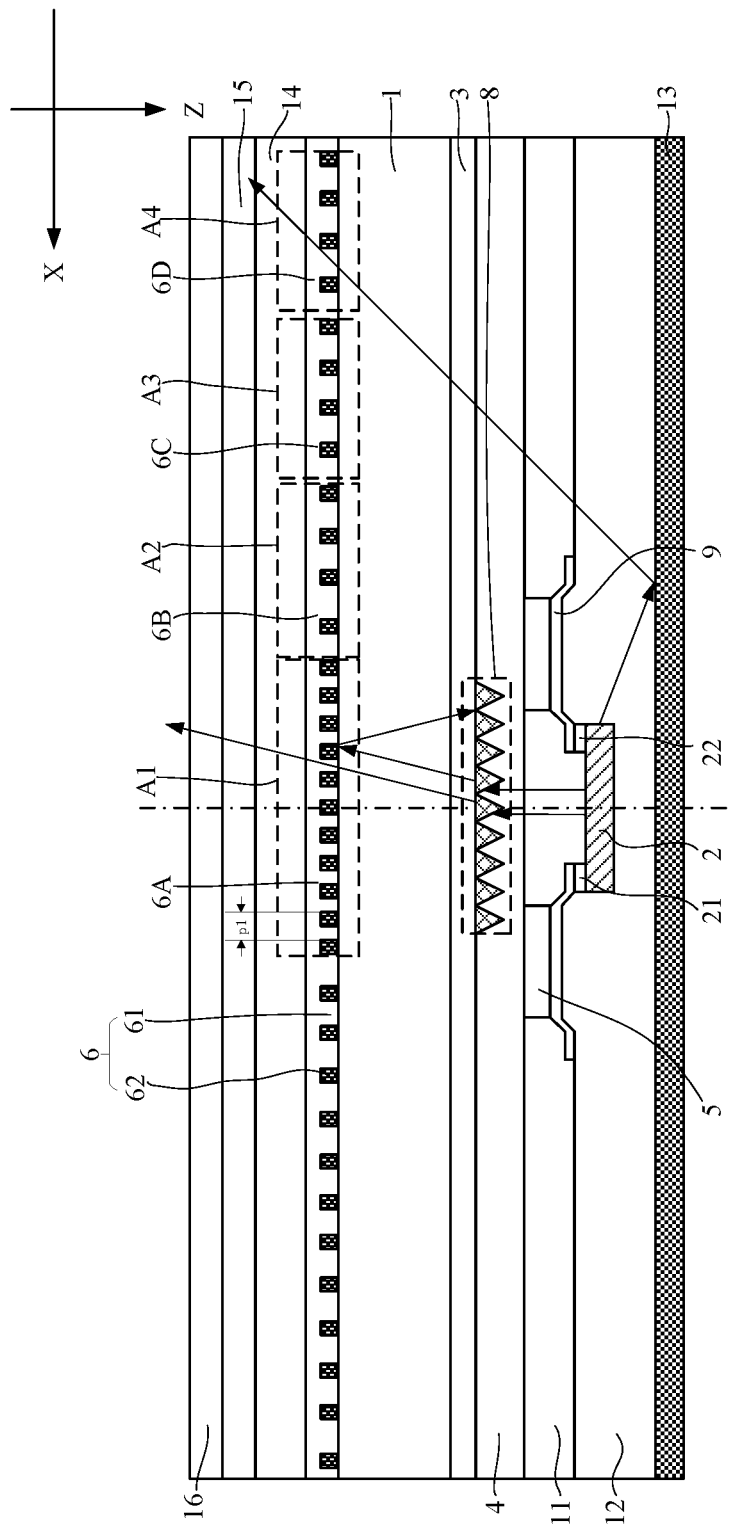
FIG. 7 is a schematic structural diagram of a backlight module according to some exemplary embodiments of the present disclosure, for example, FIG. 7 may be a cross-sectional view of the backlight module taken along line B-B' in FIG. 1.

FIG. 7 is a schematic structural diagram of a backlight module according to some exemplary embodiments of the present disclosure. For example, FIG. 7 may be a cross-sectional view of the backlight module in FIG. 1 taken along line B-B'. Referring to FIG. 7, the backlight module may include a first substrate 1 and an LED chip array disposed on the first substrate 1.

Optionally, the LED chip array may include a plurality of Mini LED chips 2. In the embodiment shown in FIG. 7, the Mini LED chip 2 may be a face-up chip.

The backlight module may further include a light control structure 6 disposed on the first substrate 1. For example, for the light control structure 6, reference may be made to FIG. 6A and FIG. 6B, and the above descriptions related to FIG. 6A and FIG. 6B may be incorporated here.

Referring to FIGS. 6A, 6B and 7, the light control structure 6 may include a plurality of light transmitting portions 61 and a plurality of light reflecting portions 62. In the first direction X, the plurality of light transmitting portions 61 and the plurality of light reflecting portions 62 are alternately arranged, that is, a light reflecting portion 62 is arranged between two adjacent light transmitting portions 61, and a light transmitting portion 61 is arranged between two adjacent light reflecting portions 62. In the second direction Y, the plurality of light transmitting portions 61 and the plurality of light reflecting portions 62 are alternately arranged, that is, a light reflecting portion 62 is arranged between two adjacent light transmitting portions 61, and a light transmitting portion 61 is arranged between two adjacent light reflecting portions 62.

In the exemplary embodiment shown in FIG. 7, the light reflecting portion 62 may be a light control microstructure formed of a reflective material or an opaque material. The light transmitting material may be filled between every two adjacent light reflecting portions 62. Optionally, the light reflecting portions 62 may be covered by the light transmitting material. The light transmitting portion 61 is formed of the light transmitting material filled between every two adjacent light reflecting portions 62.

For example, each light reflecting portion 62 may be formed of a metal such as Ag, Al, AlNd (aluminum neodymium), CuNi (copper-nickel alloy), etc., or a laminated structure formed of ITO/Ag/ITO. The light transmitting material may include a material such as silicon nitride, silicon oxide, etc.

The light control structure 6 and the LED chip 2 are respectively disposed on two opposite sides of the first substrate 1. In FIG. 7, the LED chip 2 is arranged on a lower side of the first substrate 1, and the light control structure 6 is arranged on an upper side of the first substrate 1.

As mentioned above, the backlight module may include a plurality of light control regions. Referring to FIGS. 4, 5 and 7, the plurality of light control regions are schematically shown as four light control regions A1, A2, A3 and A4.

Specifically, a plurality of light control regions are formed for each LED chip 2. For ease of description, the plurality of light control regions corresponding to each LED chip 2 may be referred to as a light control region group. The plurality of LED chips 2 are in one-to-one correspondence with the plurality of light control region groups. In the exemplary embodiments of FIGS. 4, 5 and 7, the light control region group corresponding to each LED chip 2 includes four light control regions A1, A2, A3 and A4. However, the embodiments of the present disclosure are not limited thereto. For example, the light control region group corresponding to each LED chip 2 includes two light control regions, three light control regions, five light control regions or more light control regions. That is, each light control region group may include N light control regions, where N is a positive integer greater than or equal to 2; the N light control regions include at least a first light control region and a second light control region, an orthographic projection of a $N_{th}$ light control region of each light control region group on the first substrate encloses an orthographic projection of a $N-1_{th}$ light control region of the light control region group on the first substrate.

In each light control region group, an orthographic projection of the first light control region A1 on the first substrate 1 may cover an orthographic projection of the LED chip 2 corresponding to the light control region group on the first substrate 1. An area of the orthographic projection of the first light control region A1 on the first substrate 1 may be larger than an area of the orthographic projection of the LED chips 2 corresponding to the light control region group on the first substrate 1. An orthographic projection of the second light control region A2 on the first substrate 1 may enclose the orthographic projection of the first light control region A1 on the first substrate 1. An orthographic projection of the third light control region A3 on the first substrate 1 may enclose the orthographic projection of the second light control region A2 on the first substrate 1. An orthographic projection of the fourth light control region A4 on the first substrate 1 may enclose the orthographic projection of the third light control region A3 on the first substrate 1.

For example, the orthographic projection of the first light control region A1 on the first substrate 1 may be circular, and the orthographic projection of each of the second light control region A2, the third light control region A3 and the fourth light control region A4 on the first substrate 1 may be annular.

For ease of description, a part of the light control structure 6 in the first light control region A1 is referred to as a first light control substructure 6A, and a part of the light control structure 6 in the second light control region A2 is referred to as a second light control substructure 6B, a part of the light control structure 6 in the third light control region A3 is referred to as a third light control substructure 6C, and a part of the light control structure 6 in the fourth light control region A4 is referred to as a fourth light control substructure 6D.

Correspondingly, a plurality of light control substructures in each light control region group may be referred to as a light control substructure group. In the above exemplary embodiment, each light control substructure group may include a first light control substructure 6A, a second light control substructure 6B, a third light control substructure 6C, and a fourth light control substructure 6D.

In the embodiments of the present disclosure, in one same light control substructure group, a proportion of the light transmitting portions 61 in each light control substructure is different. Correspondingly, a proportion of the light reflecting portions 62 in each light control substructures is also different. In this way, each light control region with a different light transmittances and a different light reflectivity may be achieved.

Herein, the expression "a proportion of the light transmitting portions in the light control substructure" may be expressed by a ratio of an area of orthographic projections of all the light transmitting portions included in the light control substructure on the first substrate to an area of the light control region where the light control substructure is located. The expression "a proportion of the light reflecting portions in the light control substructure" may be expressed by a ratio of an area of orthographic projections of all the light reflecting portions included in the light control substructure on the first substrate to the area of the light control region where the light control substructure is located.

In the exemplary embodiment shown in FIG. 7, in one same light control substructure group, the proportions of light transmitting portions 61 in the first light control substructure 6A, the second light control substructure 6B, the third light control substructure 6C and the fourth light control substructure 6D are different from each other, and the proportions of the light reflecting portions 62 in the first light control substructure 6A, the second light control substructure 6B, the third light control substructure 6C and the fourth light control substructure 6D are also different from each other.

For example, the proportion of the light transmitting portions 61 in the first light control substructure 6A may be about 22%; the proportion of the light transmitting portions 61 in the second light control substructure 6B may be about 29%; the proportion of the light transmitting portions 61 in the third light control substructure 6C may be about 27%; and the proportion of the light transmitting portions 61 in the fourth light control substructure 6D may be about 28%.

Optionally, the period values of the first light control substructure 6A, the second light control substructure 6B, the third light control substructure 6C and the fourth light control substructure 6D may not be equal to each other. For example, in the embodiment shown in FIG. 7, the light control microstructure is the reflective portion 62. The period value of each light control substructure 6A may be represented by a sum of a size of one light reflecting portion 62 in one direction (for example, a size in the first direction X) and a distance between two adjacent light reflecting portions 62 in the direction (for example, in the first direction X), as indicated by reference numeral p1 in FIG. 7.

As described above, the period value of the first light control substructure 6A may be smaller than the period value of the second light control substructure 6B, and the period value of each of the third light control substructure 6C and the fourth light control substructure 6D may be between the period value of the first light control substructure 6A and the period value of the second light control substructure 6B.

Through research, it is found that the period value of each of the first light control substructure 6A, the second light control substructure 6B, the third light control substructure 6C and the fourth light control substructure 6D needs to be set within a range of 10 microns and 100 microns. When the period value is less than 10 microns, a processing difficulty may be increased due to a limitation of a resolution of a mask used in a patterning process. When the period value is greater than 100 microns, each light control microstructure will be visually visible to a human eye, which may reduce a display quality.

Through such arrangement, each light control region with a different light transmittance and a light reflectivity may be achieved, thereby improving the uniformity of the backlight module in each light control region.

Continuing to refer to FIG. 7, the backlight module may further include a light diffusing structure 8. The light diffusing structure 8 is configured to diffuse light emitted from the LED chip 2 and incident on the light diffusing structure 8. Optionally, the backlight module may include a plurality of light diffusing structures 8, and the plurality of light diffusing structures 8 are in one-to-one correspondence with the plurality of LED chips 2. For example, orthographic projections of the plurality of light diffusing structures 8 on the first substrate may be located in the plurality of first light control regions A1, respectively, and the orthographic projections of the plurality of light diffusing structures 8 on the first substrate may cover the orthographic projections of the plurality of LED chips on the first substrate, respectively.

The light diffusing structure 8 is disposed on a side of the first substrate 1 close to the LED chip 2, and is disposed between the LED chip 2 and the first substrate 1.

Each light diffusing structure 8 may include a plurality of prisms 81. For example, each prism 81 may extend in the second direction Y, that is, each prism 81 may be a strip prism. The plurality of prisms 81 are arranged in the first direction X.

Figure 8:
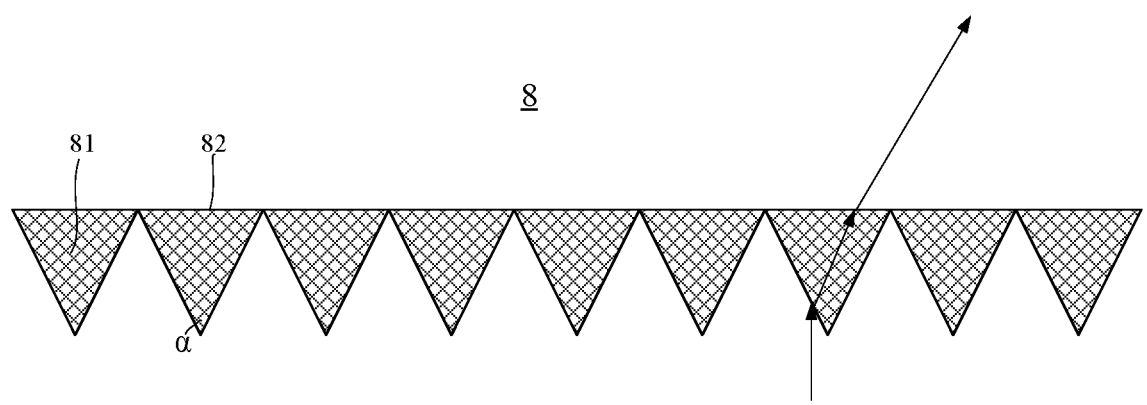
FIG. 8 is a schematic structural diagram of a light diffusing structure included in a backlight module according to some exemplary embodiments of the present disclosure.

FIG. 8 is a schematic structural diagram of a light diffusing structure included in a backlight module according to some exemplary embodiments of the present disclosure. As shown in FIGS. 7 and 8, each prism 81 is a triangular prism. Each prism 81 has an apex angle α and an edge 82 opposite to the apex angle α. The edge 82 may be located on a side of the prism 81 close to the first substrate 1, and the apex angle α may be located on a side of the prism 81 away from the first substrate 1. As shown in FIG. 8, a vertically upward light ray is diffused after passing through the prism 81.

Alternatively, the apex angles α of the plurality of prisms 81 may be set to be the same with each other. In this way, it is beneficial to manufacture the light diffusing structure.

Alternatively, the apex angles α of at least some of the plurality of prisms 81 may be set to be different from each other, which is more beneficial for the light diffusion.

Optionally, the backlight module may further include a buffer layer 3 disposed between the first substrate 1 and the light diffusing structure 8, the buffer layer 3 may improve a flatness of a lower surface of the first substrate 1 and may be used to adjust a stress. In this way, it is beneficial for the light diffusing structure 8 to be formed on the first substrate 1.

Referring to FIG. 7, the backlight module may further include a first planarization layer 4 disposed on the first substrate 1. The first planarization layer 4 may cover the plurality of prisms 81. For example, the first planarization layer 4 may be made of a transparent organic material, the prisms 81 may be made of a transparent organic material such as a transparent resin, and a refractive index of the material of the first planarization layer 4 is greater than that of the material of the light diffusing structure 8. For example, the refractive index of the material of the first planarization layer 4 may be about 1.55 to 1.65, and the refractive index of the material of the light diffusing structure 8 may be about 1.2. Such refractive index matching is more beneficial for the light diffusing of the light diffusing structure.

Continuing to refer to FIG. 7, the backlight module may further include a first conductive layer 5 and a second conductive layer 9 disposed on the first substrate 1. The first conductive layer 5 is located on a side of the first planarization layer 4 away from the first substrate 1, and the second conductive layer 9 is located on a side of the first conductive layer 5 away from the first substrate 1. Both the first conductive layer 5 and the second conductive layer 9 may be made of a metal conductive material, such as copper. A thickness of the first conductive layer 5 may be greater than a thickness of the second conductive layer 9.

Specifically, a plurality of wirings may be provided in the first conductive layer 5, and a plurality of wirings may also be provided in the second conductive layer 9. Each LED chip 2 may include two electrodes, namely a first electrode 21 and a second electrode 22. The plurality of wirings are respectively electrically connected to the first electrode 21 and the second electrode 22 for providing electrical signals to the LED chip 2.

Optionally, the backlight module may further include a cover layer 11 disposed on the side of the first planarization layer 4 away from the first substrate 1, and the cover layer 11 may be located among the plurality of wirings in the first conductive layer 5, or may also be located among the plurality of wirings in the second conductive layer 9. The cover layer 11 may be a laminated structure. For example, the cover layer may include a silicon nitride layer and a resin layer; and the cover layer 11 may also include a single-layer structure composed of a low-temperature organic material.

The backlight module may further include an encapsulating layer 12 on a side of the LED chip 2 away from the first substrate 1. The encapsulating layer 12 covers the LED chip 2 to protect the LED chip 2. In some exemplary embodiments, an encapsulant is coated on the side of the LED chip 2 away from the first substrate 1, and the encapsulating layer 12 is formed after drying. The encapsulant may include a transparent light-curable or heat-curable resin, such as silica gel, etc.

The backlight module may further include a reflective structure 13 disposed on a side of the encapsulation layer 12 away from the first substrate 1. An orthographic projection of the reflective structure 13 on the first substrate 1 covers the orthographic projection of the plurality of LED chips 2 on the first substrate 1, and also covers the orthographic projection of the light control structure 6 on the first substrate 1.

In the embodiment shown in FIG. 7, the LED chip 2 may emit light upwardly, and the light-emitting side of the backlight module is the upper side shown in FIG. 7. In practical applications, a part of the light will be incident on the reflective structure 13, and the part of the light may be reflected by the reflective structure 13 toward the light-emitting side, thereby improving an overall light efficiency of the backlight module.

Optionally, continuing to refer to FIG. 7, the backlight module may further include a quantum dot film layer 14, that is, a combined structure of the LEDs and quantum dots is adopted in the backlight module. The quantum dot film layer 14 and the LED chip 2 are respectively disposed on two opposite sides of the first substrate 1. Specifically, the quantum dot film layer 14 is disposed on a side of the light control structure 6 away from the first substrate 1.

For example, the light emitted by the LED chip 2 may be blue light, that is, the LED is a blue light LED. The quantum dot film layer 14 may include red light quantum dots that emit red light after being excited by the blue light and/or green light quantum dots that emit green light after being excited by the blue light. However, the embodiments of the present disclosure are not limited thereto, and the quantum dot film layer 14 may also include yellow quantum dots that emit yellow light after being excited by the blue light. By arranging such quantum dot film layer 14, an optical effect of converting the light of the blue LED chip into white light for emission can be achieved. Specifically, the light emitted from the LED chip 2 is blue light, and when the blue light passes through the quantum dot film layer 14, a part of the blue light is converted into red light and green light under the excitation of the blue light. The red light, the green light and the unconverted blue light are then mixed to form the white light.

Optionally, the backlight module may further include a brightness enhancement film layer 15 and a diffusion film layer 16. The brightness enhancement film layer 15 is disposed on a side of the quantum dot film layer 14 away from the first substrate 1, and the diffusion film layer 16 is disposed on a side of the brightness enhancement film layer 15 away from the first substrate 1.

Referring to FIGS. 2 and 7, through the light diffusing structure and the light control structure disposed on the first substrate, the light emitted from the LED chip 2 may be divisionally taken, which may improve the uniformity of the emitted light of the entire backlight module. For example, the uniformity of the emitted light of the entire backlight module may reach 90%. Moreover, in a conventional backlight module, a lower diffusing plate with a relatively thick thickness is generally required. For example, the lower diffusing plate is arranged between the LED chip and the quantum dot film layer. However, the thickness of the lower diffusing plate is relatively thick, and a loss of a light effect of light passing through the lower diffusing plate is relatively large, for example, the loss may reach 20% to 30%. In the embodiments of the present disclosure, by providing the light diffusing structure and the light control structure on the first substrate, the lower diffusing plate is no more required. In this way, not only the thickness of the backlight module may be reduced, but the overall light effect of the backlight module may be improved.

In the embodiments of the present disclosure, each wiring for the LED chip array is formed on the first substrate 1 such as a glass substrate, that is, the first substrate 1 is served as a carrier substrate for the LED chip. In addition, after light emitted from the LED chip passes through the first substrate 1, it is emitted after being processed by the light diffusion structure and the light control structure. During the process, the first substrate 1 may be used as a light guide plate, which may reduce an optical path mixing distance of the backlight module. In addition, the first substrate 1 may also be used as the carrier substrate for the light diffusing structure, the light control structure, and the like. In this way, the thickness of the backlight module may be further reduced, and a competitiveness of the product may be improved. Specifically, referring back to FIG. 2, the backlight module mainly includes the first substrate 1 such as a glass substrate, the LED chips 2 and the encapsulation layer 12 on one side of the first substrate 1, the quantum dot film layer 14, the brightness enhancement film layer 15 and the diffusion film layer 16 on the other side of the first substrate 1. The thickness of the first substrate 1 is about 0.5 mm, a thickness of a combination of the LED chips 2 and the encapsulation layer 12 is about 0.2 mm, a thickness of the quantum dot film layer 14 is about 0.2 mm, a thickness of the brightness enhancement film layer 15 is about 0.13 mm, and a thickness of the diffusion film layer 16 is about 0.1 mm. In this way, the overall thickness of the backlight module is about 1.13 mm. It should be seen that the overall thickness of the backlight module may be significantly reduced.

Figure 9:
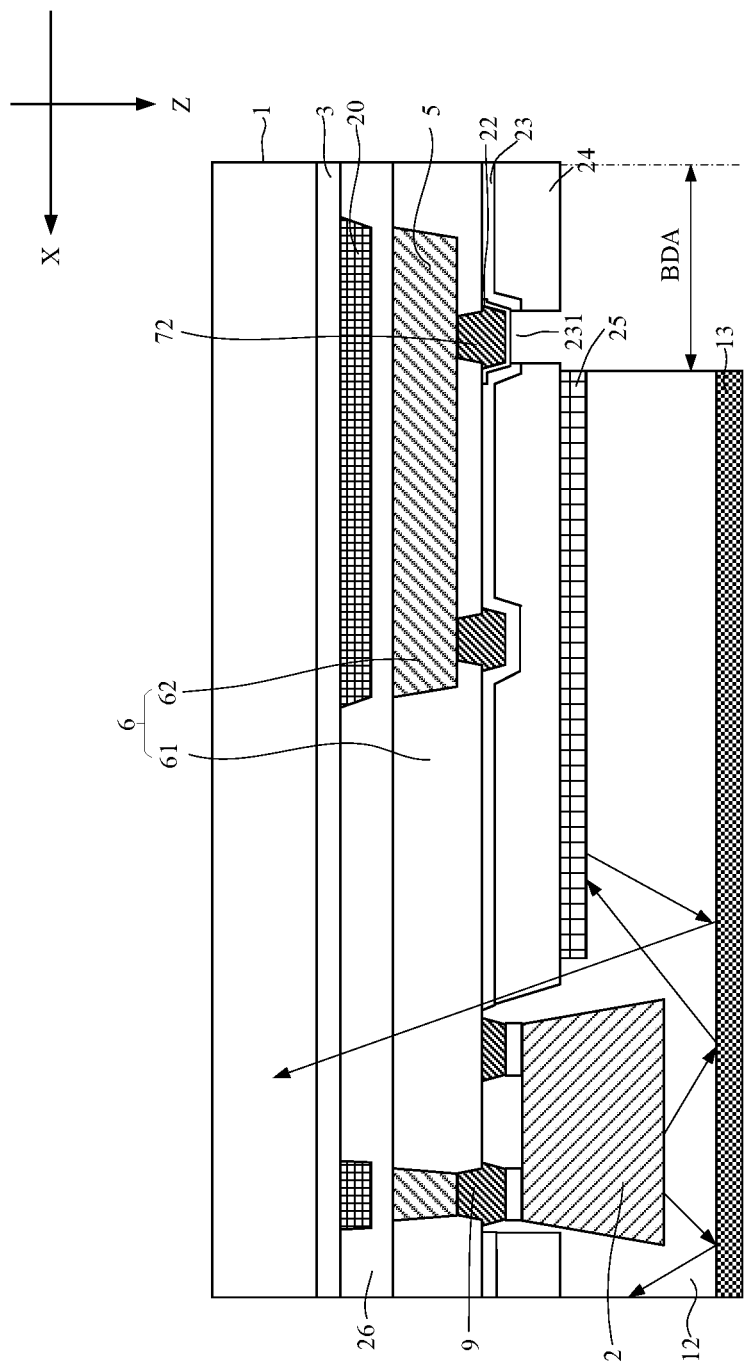
FIG. 9 is a schematic structural diagram of a backlight module according to some exemplary embodiments of the present disclosure, for example, FIG. 9 may be a cross-sectional view of the backlight module taken along line C-C' in FIG. 1.

FIG. 9 is a schematic structural diagram of a backlight module according to some exemplary embodiments of the present disclosure. For example, FIG. 9 may be a cross-sectional view of the backlight module taken along line C-C' in FIG. 1. Referring to FIG. 9, the backlight module may include a first substrate 1 and an LED chip array disposed on the first substrate 1.

Optionally, the LED chip array may include a plurality of Mini LED chips 2. In the embodiment shown in FIG. 9, the Mini LED chip 2 may be a face-down chip.

A light control structure 6 of the backlight module is formed by wirings. For example, the light control structure 6 may refer to FIG. 6C, and the above descriptions related to FIG. 6C may be incorporated here.

Figure 10:
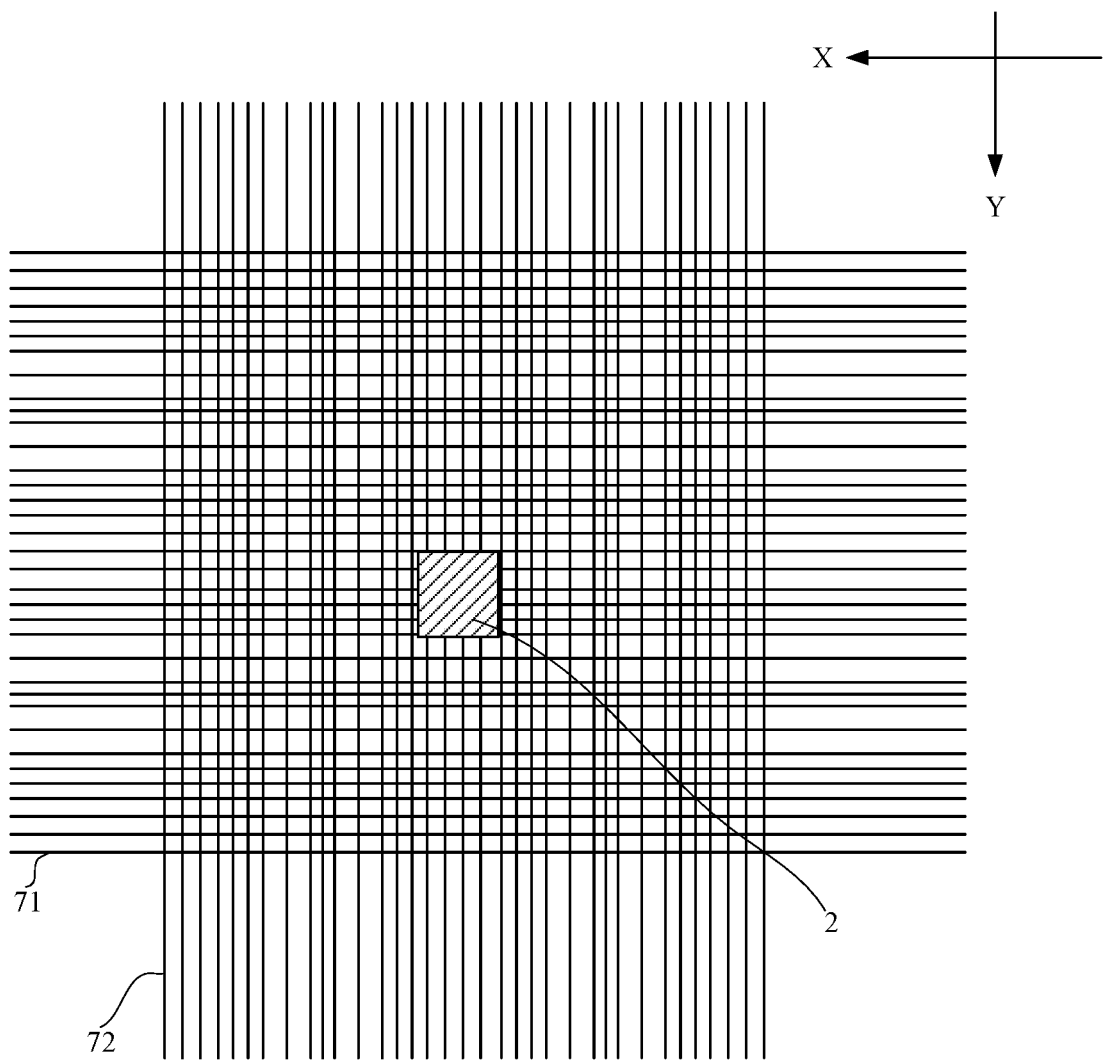
FIG. 10 is a partial plan view of a light control structure formed by wirings included in a backlight module according to some exemplary embodiments of the present disclosure.
Figure 11:
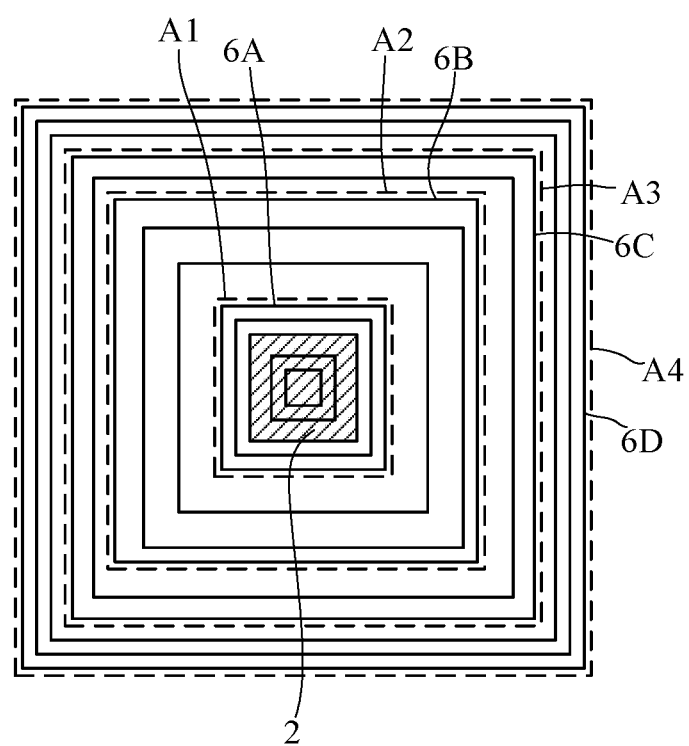
FIG. 11 is a partial enlarged view of the light control structure shown in FIG. 10, in which a structure of a shape of character "回" is schematically shown.

FIG. 10 is a partial plan view of a light control structure formed by wirings included in a backlight module according to some exemplary embodiments of the present disclosure. FIG. 11 is a partial enlarged view of the light control structure shown in FIG. 10, in which a structure of a shape of character "回" is schematically shown.

Referring to FIGS. 6C and 9 to 11, a plurality of wirings 7 are arranged on a light-emitting side of each LED chip 2, and the plurality of wirings 7 are arranged at intervals. Since the wirings are formed of an opaque material, a part of the wirings 7 in each light control region may be used to form light reflecting portions 62 of the light control structure, and gaps among the wirings 7 may be used to form light transmitting portions 61 of the light control structure.

Specifically, the backlight module may include: a buffer layer 3 disposed on the first substrate 1; a first reflective layer 20 disposed on a side of the buffer layer 3 away from the first substrate 1; a first conductive layer 5 disposed on a side of the first reflective layer 20 away from the first substrate 1, and the first conductive layer 5 is provided with a plurality of wirings 7; a first cover layer 21 disposed on the first substrate 1, the first cover layer 21 is filled among the plurality of wirings 7 and covers a part of the first conductive layer 5; a second conductive layer 9 disposed on a side of the first conductive layer 5 away from the first substrate 1, and the second conductive layer 9 is provided with a plurality of wirings 7; a protective layer 22 disposed on a side of the second conductive layer 9 away from the first substrate 1; a first passivation layer 23 disposed on a side of the protective layer 22 away from the first substrate 1; a second cover layer 24 disposed on a side of the first passivation layer 23 away from the first substrate 1; a second reflective layer 25 disposed on a side of the second cover layer 24 away from the first substrate 1; an encapsulating layer 12 disposed on the first substrate 1; and a reflective structure 13 disposed on a side of the encapsulating layer 12 away from the first substrate 1. Optionally, a second passivation layer 26 may also be disposed between the first reflective layer 20 and the first conductive layer 5.

For example, the wirings may include wirings formed of a conductive material, and the conductive material is generally an opaque material, such as a metal conductive material such as Cu. The wirings 7 may be electrically connected to an electrode of each LED chip 2 for providing electrical signals to each LED chip 2.

For example, each wiring 7 in the first conductive layer 5 may extend in the first direction X, and each wiring 7 in the second conductive layer 9 may extend in the second direction Y. For ease of description, the wiring extending in the first direction X may be referred to as a first wiring 71, and the wiring 7 extending in the second direction Y may be referred to as a second wiring 72. In this way, projections of the first wirings 71 and the second wirings 72 in the XY plane form a shape of character "回", as shown in FIG. 10 and FIG. 11.

For example, a thickness of the first conductive layer 5 may be greater than a thickness of the second conductive layer 9.

Specifically, referring to FIGS. 10 and 11, a plurality of light control regions are formed for each LED chip 2. For ease of description, the plurality of light control regions corresponding to each LED chip 2 may be referred to as a light control region group. The plurality of LED chips 2 are in one-to-one correspondence with a plurality of light control region groups. The light control region group corresponding to each LED chip 2 includes four light control regions A1, A2, A3 and A4. However, the embodiments of the present disclosure are not limited thereto. For example, the light control region group corresponding to each LED chip 2 may include two light control region, three light control region, five light control regions or more light control regions. For example, an orthographic projection of the first light control region A1 on the first substrate 1 may be a square, and an orthographic projection of each of the second light control region A2, the third light control region A3 and the fourth light control region A4 is on the first substrate 1 may be a square annulus.

Similarly, in each light control region group, the orthographic projection of the first light control region A1 on the first substrate 1 may cover the orthographic projection of the LED chip 2 corresponding to the light control region group on the first substrate 1. An area of the orthographic projection of the first light control region A1 on the first substrate 1 may be larger than an area of the orthographic projection of the LED chip 2 corresponding to the light control region group on the first substrate 1. The orthographic projection of the second light control region A2 on the first substrate 1 may enclose the orthographic projection of the first light control region A1 on the first substrate 1. An orthographic projection of the third light control region A3 on the first substrate 1 may enclose the orthographic projection of the second light control region A2 on the first substrate 1. An orthographic projection of the fourth light control region A4 on the first substrate 1 may enclose the orthographic projection of the third light control region A3 on the first substrate 1.

For ease of description, a part of the light control structure 6 in the first light control region A1 is referred to as a first light control substructure 6A, and a part of the light control structure 6 in the second light control region A2 is referred to as a second light control substructure 6B, a part of the light control structure 6 in the third light control region A3 is referred to as a third light control substructure 6C, and a part of the light control structure 6 in the fourth light control region A4 is referred to as a fourth light control substructure 6D.

Correspondingly, a plurality of light control substructures in each light control region group may be referred to as a light control substructure group. In the above exemplary embodiments, each light control substructure group may include the first light control substructure 6A, the second light control substructure 6B, the third light control substructure 6C, and the fourth light control substructure 6D.

In the embodiments of the present disclosure, in one same light control substructure group, a proportion of the light transmitting portions 61 (ie, the gaps among the wirings 7) in each light control substructure is different. Correspondingly, a proportion of the light reflecting portions 62 in each light control substructure (ie, a part of the wirings 7 in each light control region) is also different. In this way, each light control region with a different light transmittance and a different light reflectivity may be achieved.

In the exemplary embodiment shown in FIGS. 9 to 11, in the same light control substructure group, the proportions of the light transmitting portions 61 in the first light control substructure 6A, the second light control substructure 6B, the third light control substructure 6C and the fourth light control substructure 6D are different from each other. Correspondingly, the proportions of the light reflecting portions 62 in the first light control substructure 6A, the second light control substructure 6B, the third light control substructure 6C and the fourth light control substructure 6D are different from each other For example, the proportion of the light transmitting portions 61 in the first light control substructure 6A may be about 22%; the proportion of the light transmitting portions 61 in the second light control substructure 6B may be about 29%; the proportion of the light transmitting portions 61 in the third light control substructure 6C may be about 27%; and the proportion of the light transmitting portions 61 in the fourth light control substructure 6D may be about 28%.

As mentioned above, since the light transmittance of each light control region is different, a size of the wirings in each light control region should be different. For example, for ease of processing, line widths of the wirings located in each light control region may be the same. At this time, wiring spacing in each light control region may be designed to be different, so as to achieve different light transmittances in different light control regions.

Specifically, in the exemplary embodiments, the wiring spacing in the first light control region A1 may be the smallest, the wiring spacing in the second light control region A2 may be the largest, and the wiring spacing in the third light control region A3 and the fourth light control region A4 may be between the wiring spacing in the first light control region A1 and the wiring spacing in the second light control region A2.

It should also be noted that, in some optional embodiments, line widths of the wirings extending through each light control region may also be different. For example, the line width of the wirings extending through the first light control region A1 may be set larger to achieve a greater light reflectivity in the first light control region A1; the line width of the wirings extending through the second light control region A2 is set smaller to achieve a smaller light reflectivity in the second light control region A2. That is, the line width of the wirings extending through the first light control region A1 may be larger than the line width of the wirings extending through the second light control region A2.

The wirings 7 are arranged densely in the first light control region A1, the wirings 7 are arranged sparsely in the second light control region A2; and in the third light control region A3 and the fourth light control region A4, a sparse degree of the wirings 7 is between the sparse degree in the first light control region A1 and the sparse degree in the second light control region A2.

Optionally, in each light control region, a wiring period may be in a range of 2 to 100 microns. The wiring period here may be equal to a sum of a width of a wiring and spacing between two adjacent wirings. When the wiring period is less than 2 microns, a processing difficulty may be increased due to a limitation of a resolution of a mask used in a patterning process. When the wiring period is greater than 100 microns, each wiring will be visually visible to an human eye, which may reduce a display quality.

Through such arrangement, each light control region with a different light transmittance and a different light reflectivity may be achieved, thereby improving an uniformity of the backlight module in each light control region.

It should be noted that, in the embodiments of the present disclosure, in order to match the light transmittance in each light control region, a part of the wirings in each light control region may be designed as wirings that do not transmit electrical signals, that is, the part of the wirings are mainly used for light control.

Continuing to refer to FIG. 9, the LED chip 2 is a face-down chip that emits light downwardly. That is, the emitted light of the LED chip 2 is emitted downwardly, and is emitted toward an upper side after being reflected by the reflective structure 13.

An orthographic projection of the second reflective layer 25 on the first substrate 1 at least partially overlaps with an orthographic projection of the first wirings 71 on the first substrate 1, and the orthographic projection of the second reflective layer 25 on the first substrate 1 at least partially overlaps with an orthographic projections of the second wirings 72 on the first substrate 1. The orthographic projection of the second reflective layer 25 on the first substrate 1 is annular. For example, similar to the plurality of wirings, the orthographic projection of the second reflective layer 25 on the first substrate 1 may also be in a shape of character "回".

In this way, as shown in FIG. 9, after a part of the light reflected by the reflective structure 13 is incident on the second reflective layer 25, it is emitted after being further sequentially reflected by the second reflective layer 25 and the reflective structure 13. In this way, a light mixing distance of the light emitted from the LED chip 2 may be increased, which is beneficial for better light mixing. In addition, the second reflective layer 25 is located below each wiring 7, which may prevent a large amount of emitted light from directly irradiating the wirings 7, thereby reducing an absorption of the emitted light by the copper wirings, which is beneficial to improve the light effect.

By arranging the reflective structure 13 and the second reflective layer 25, a part of the emitted light from the LED chip 2 may be converted into light with a large angle, so that the part of the emitted light may be incident on a light control region other than the first light control region A1. That is, they may function similarly to the light diffusing structures 8 described above. In this way, they may be cooperated with the light control structure formed by the wirings, which may improve the uniformity of the light emitted by the display module and improve the overall light effect.

The first reflective layer 20 is arranged between the first conductive layer 5 and the base substrate 1. An orthographic projection of the first reflective layer 20 on the first substrate 1 at least partially overlaps with the orthographic projection of the first wirings 71 on the first substrate 1. For example, the orthographic projection of the first reflective layer 20 on the first substrate 1 covers the orthographic projection of the first wirings 71 on the first substrate 1. The orthographic projection of the first reflective layer 20 on the first substrate 1 at least partially overlaps with the orthographic projection of the second wirings 72 on the first substrate 1. For example, the orthographic projection of the first reflective layer 20 on the first substrate 1 also covers the orthographic projection of the second wirings 72 on the first substrate 1. The orthographic projection of the first reflective layer 20 on the first substrate 1 is annular. For example, similar to the plurality of wirings, the orthographic projection of the first reflective layer 20 on the first substrate 1 may also be in a shape of character "回".

For example, a quantum dot film layer 14 is further disposed on a side of the first substrate 1 away from the buffer layer 3. Scattering may occur after light is incident on the quantum dot film layer 14, and at this time, a part of the light is reflected back by the quantum dot film layer 14. By arranging the first reflective layer 20, the part of the light may be reflected toward the light-emitting side, so as to prevent the part of the light from being incident on the copper wirings and being partially absorbed, thereby improving the overall light effect of the backlight module.

Referring to FIG. 9, a second passivation layer 26 is disposed between the first reflective layer 20 and the first conductive layer 5. During a manufacturing process, the second passivation layer 26 may protect the first reflective layer 20. Optionally, the second passivation layer 26 may also be omitted, that is, the first reflective layer 20 and the first conductive layer 5 may be in contact, so that a transmission resistance of each wiring may be reduced, and a problem of IR Drop may be reduced.

The protective layer 22 covers a part of the second conductive layer 9 in a bonding area BDA. As shown in FIG. 9, some wirings 72 are located in the bonding area BDA, and surfaces of the wirings 72 away from the first substrate 1 are needed to be exposed for an electrical connection with an external circuit. In the embodiment of FIG. 9, the exposed surfaces of the wirings 72 are covered with the protective layer 22 to prevent the copper wirings from being oxidized. For example, the protective layer 22 may be made of a conductive material such as ITO, etc.

The first passivation layer 23 covers at least a part of the second conductive layer 9. As shown in FIG. 9, an opening 231 is provided in the first passivation layer 23 to expose the surface of the protective layer 22 away from the first substrate 1, so as to facilitate the protective layer 22 to be electrically connected to the external circuit.

Optionally, continuing to refer to FIG. 9, the backlight module may further include a quantum dot film layer 14.

That is, a combined structure of the LED and quantum dots is adopted in the backlight module. The quantum dot film layer 14 and the LED chip 2 are respectively disposed on two opposite sides of the first substrate 1. Specifically, the quantum dot film layer 14 is disposed on a side of the first substrate 1 away from the light control structure 6.

Optionally, the backlight module may further include a brightness enhancement film layer 15 and a diffusion film layer 16. The brightness enhancement film layer 15 is disposed on the side of the quantum dot film layer 14 away from the first substrate 1, and the diffusion film layer 16 is disposed on a side of the brightness enhancement film layer 15 away from the first substrate 1.

It should be noted that, for some other structures of the backlight module shown in FIG. 9, reference may be made to the above descriptions with respect to FIG. 7, which will not be repeated here.

It should also be noted that the backlight module shown in FIG. 9 has the same advantages and effects as those described in the above embodiments. For these advantages and effects, reference may be made to the above descriptions.

Figure 12:
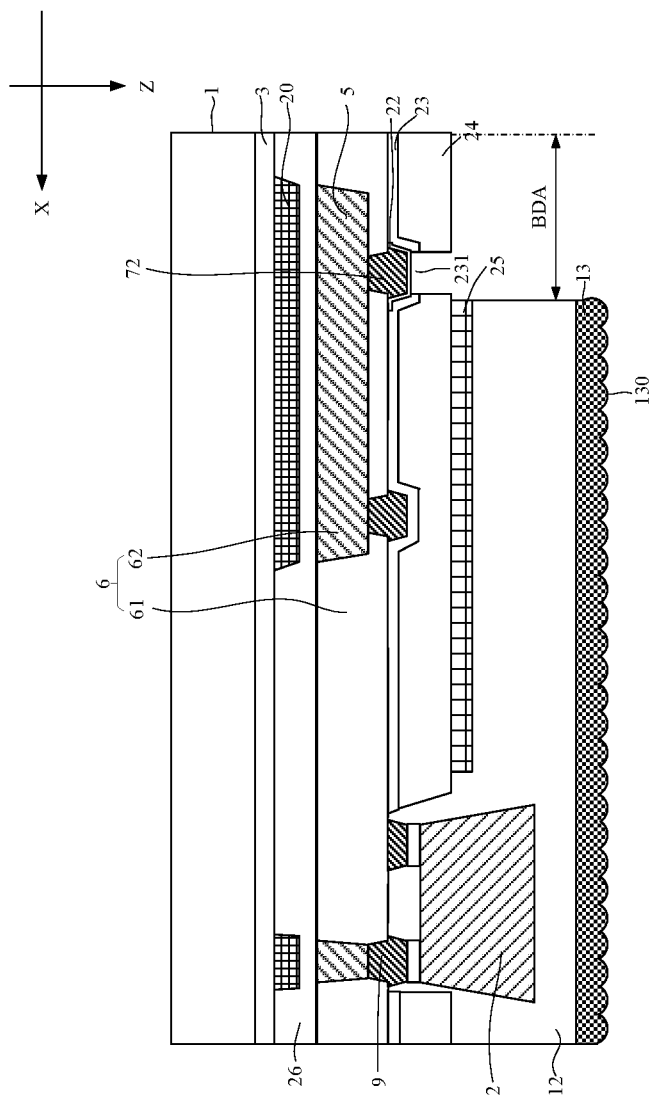
FIG. 12 is a schematic structural diagram of a backlight module according to some exemplary embodiments of the present disclosure, for example, FIG. 12 may be a cross-sectional view of the backlight module taken along line C-C' in FIG. 1.
Figure 13:
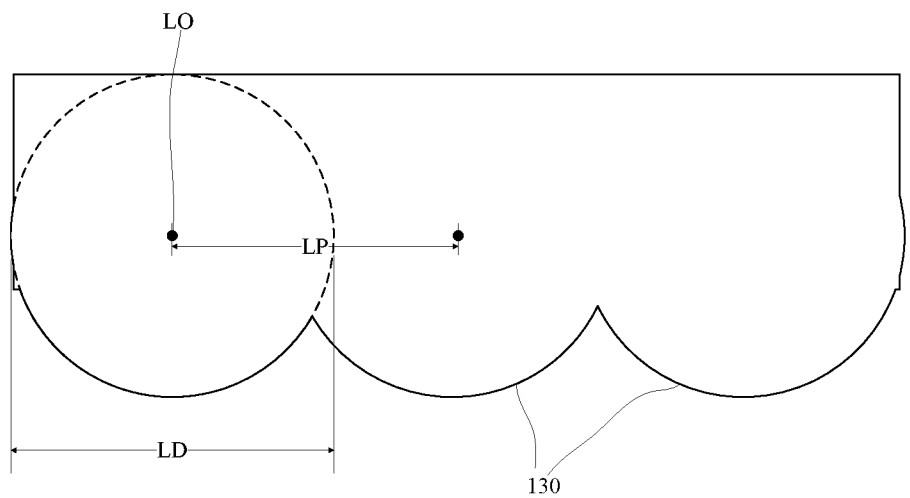
FIG. 13 is a partial enlarged view of a reflection structure included in the backlight module shown in FIG. 12.

FIG. 12 is a schematic structural diagram of a backlight module according to some exemplary embodiments of the present disclosure. For example, FIG. 12 may be a cross-sectional view of the backlight module taken along line C-C' in FIG. 1. It should be noted that a main structure of the embodiment shown in FIG. 12 is the same as that shown in FIG. 9, a difference between the two will be mainly described below, for the similarities, reference may be made to the above descriptions. The difference between the two is mainly in the reflective structure. FIG. 13 is a partial enlarged view of a reflective structure included in the backlight module shown in FIG. 12.

Referring to FIG. 12 and FIG. 13, the reflective structure 13 includes a plurality of lenses 130. The plurality of lenses 130 may be arranged on the first substrate 1 in an array. Each lens 130 may protrude in a direction away from the first substrate 1.

For example, each lens 130 may be made of an organic resin.

A protruded surface of the lens 130 is an arc surface, which may be at least a part of a circle. As shown in FIG. 13, a dashed circle with LO as a center is schematically shown, and the arc surface is a part of the dashed circle. A diameter of the circle may be represented by LD.

A period value LP of the reflective structure 13 may be represented by a center distance between two adjacent lenses 130, that is, a distance between the two circle centers LO shown in FIG. 13.

The inventor found through research that, when the diameter LD is more than twice the period value LP, the reflective structure 13 may better scatter light incident thereon. At this time, in combination with the light control structure 6 described above, the uniformity of the light emitted from the backlight module may be further improved, which is beneficial to improve the overall light effect.

Figure 14:
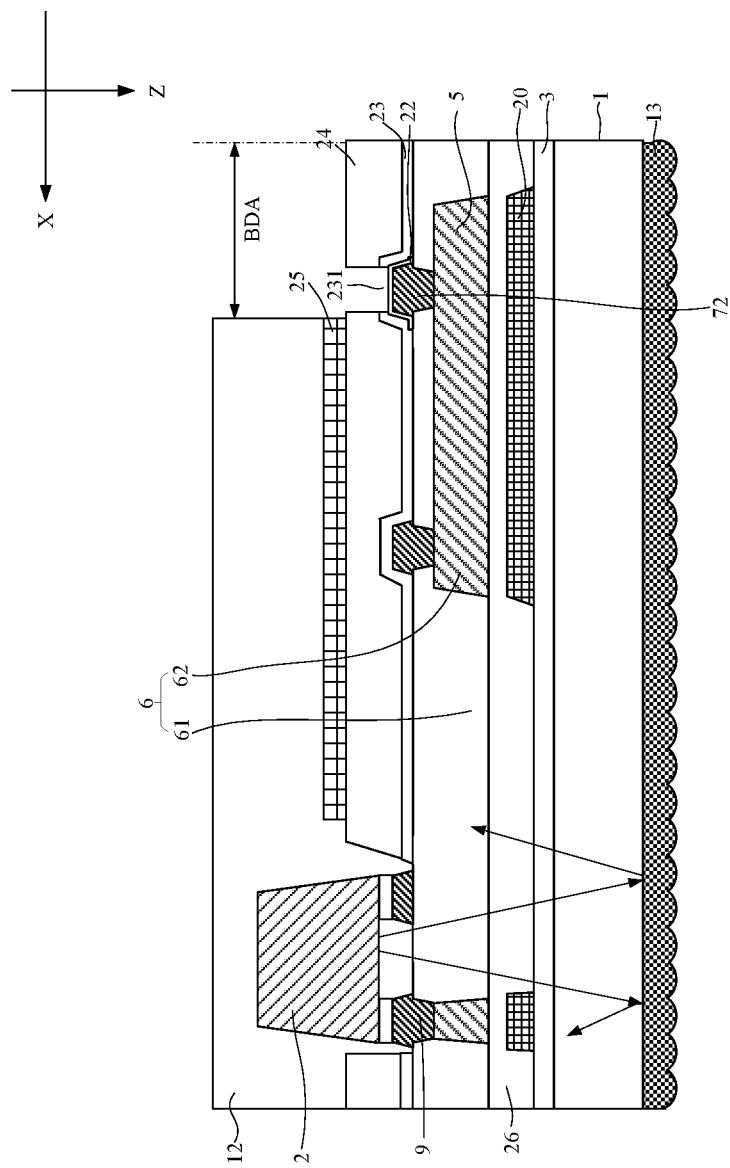
FIG. 14 is a schematic structural diagram of a backlight module according to some exemplary embodiments of the present disclosure, for example, FIG. 14 may be a cross-sectional view of the backlight module taken along line C-C' in FIG. 1.

FIG. 14 is a schematic structural diagram of a backlight module according to some exemplary embodiments of the present disclosure. For example, FIG. 14 may be a cross-sectional view of the backlight module taken along line C-C' in FIG. 1. It should be noted that a main structure of the embodiment shown in FIG. 14 is the same as that shown in FIG. 9 and FIG. 12, a difference among the three will be mainly described below, for the similarities, reference may be made to the above descriptions.

Referring to FIG. 14, the backlight module may include: a buffer layer 3 disposed on the first substrate 1; a first reflective layer 20 disposed on a side of the buffer layer 3 away from the first substrate 1; a first conductive layer 5 disposed on a side of the first reflective layer 20 away from the first substrate 1, and the first conductive layer 5 is provided with a plurality of wirings 7; a first cover layer 21 disposed on the first substrate 1, and the first cover layer 21 is filled among the plurality of wirings 7 and covering a part of the first conductive layer 5; a second conductive layer 9 disposed on a side of the first conductive layer 5 away from the first substrate 1, and the second conductive layer 9 is provided with a plurality of wirings 7; a protective layer 22 disposed on a side of the second conductive layer 9 away from the first substrate 1; a first passivation layer 23 disposed on a side of the protective layer 22 away from the first substrate 1; a second cover layer 24 disposed on a side of the first passivation layer 23 away from the first substrate 1; a second reflective layer 25 on a side of the second cover layer 24 away from the first substrate 1; a LED chip 2 disposed on the side of the second conductive layer 9 away from the first substrate 1 on the side; and an encapsulating layer 12 disposed on the first substrate 1. Optionally, a second passivation layer 26 may also be disposed between the first reflective layer 20 and the first conductive layer 5.

The backlight module further includes a reflective structure 13, and the reflective structure 13 is disposed on a side of the first substrate 1 away from the LED chip 2. That is, the reflective structure 13 and other structures on the first substrate 1 are respectively located on two opposite sides of the first substrate 1.

In this embodiment, the LED chip 2 emits light downwardly. That is, the emitted light from the LED chip 2 is emitted downwardly, and is reflected toward an upper side after being reflected by the reflective structure 13.

For example, the reflective structure 13 may be the reflective structure shown in FIG. 9, or the reflective structure shown in FIG. 12 and FIG. 13.

Figure 15:
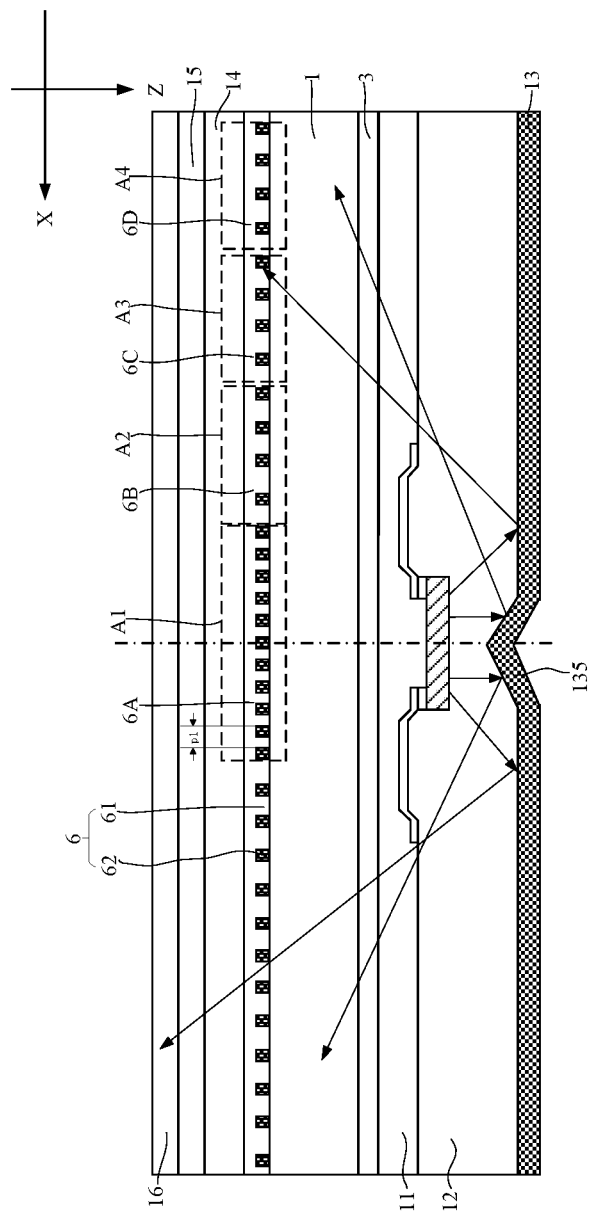
FIG. 15 is a schematic structural diagram of a backlight module according to some exemplary embodiments of the present disclosure, for example, FIG. 15 may be a cross-sectional view of the backlight module taken along line B-B' in FIG. 1.

FIG. 15 is a schematic structural diagram of a backlight module according to some exemplary embodiments of the present disclosure. For example, FIG. 15 may be a cross-sectional view of the backlight module taken along line B-B' in FIG. 1. It should be noted that a main structure of the embodiment shown in FIG. 15 is the same as that shown in FIG. 7, a difference with the two will be mainly described below, for the similarities, reference may be made to the above descriptions.

Referring to FIG. 15, the reflective structure 13 may be provided with a groove portion 135. An orthographic projection of the groove portion 135 on the first substrate 1 at least partially overlaps with an orthographic projection of the LED chip 2 on the first substrate 1. For example, the orthographic projection of the groove portion 135 on the first substrate 1 falls into the orthographic projection of the LED chip 2 on the first substrate 1.

The reflective structure 13 is disposed on a side of the LED chip 2 away from the first substrate 1, and the groove portion 135 is concave toward the LED chip 2. For example, the groove portion 135 may be formed in a pyramid structure like a pyramid.

As shown in FIG. 15, light emitted from the LED chip 2 is incident on the groove portion 135, and is emitted at a large angle toward a light-emitting side after being reflected by the groove portion 135. That is, the groove portion 135 may be used to scatter light.

It should be noted that, in FIG. 15, one groove portion 135 is shown. However, the present disclosure is not limited thereto, and in other embodiments, the reflective structure 13 may include a plurality of groove portions.

It should be understood that the structures described in the above embodiments may be combined with each other without conflict. For example, the structures shown in FIGS. 12 to 14 may also be applied to the embodiment shown in FIG. 7, and the structure shown in FIG. 15 may also be applied to the embodiment shown in FIG. 9. Specifically, in FIG. 7, the LED chip emits light upwardly, the light control structure arranged on the light-emitting side of the LED chip is formed by an individual light control layer, and a light diffusing structure is disposed between the LED chip and the individual light control layer; in FIG. 9, the LED chip is the face-down chip and emits light downwardly, the light control structure is formed by the plurality of wirings arranged in the shape of character "囗", and is matched with the plurality of reflective structures; in FIG. 12, similar to FIG. 9, the LED chip is the face-down chip and emits light downwardly, the light control structure is formed by the plurality of wirings arranged in the shape of character "囗", and is matched with the plurality of reflective structures, and the reflective structure includes a plurality of lenses; in FIG. 14, the LED chip is the face-up chip and emits light downwardly, the light control structure is formed by the plurality of wirings arranged in the shape of character "囗", and is matched with the plurality of reflective structures, and the reflective structure includes a plurality of lenses; in FIG. 15, the LED chip is the face-down chip and emits light downwardly, the light control structure is formed by the plurality of wirings arranged in the shape of character "囗", and is matched with the plurality of reflective structures, and the reflective structure includes the groove portion. The present disclosure is not limited to the above-described embodiments, and the structures in these embodiments may be replaced or combined with each other without conflict. For example, the upwardly emitted LED chip may be combined with the light control structure formed by the plurality of wirings arranged the shape of character "囗", and the light diffusing structure may also be applied to the embodiment in which the light control structure formed by the plurality of wirings arranged in the shape of character "囗". The reflective structures in FIG. 9, FIG. 12, FIG. 14 and FIG. 15 may also be applied to the embodiment in FIG. 7. For another example, in some embodiments, the backlight module may include both the light control structure formed by an individual light control layer (FIG. 7) and the light control structure formed by a plurality of wirings arranged in a shape of "囗" (FIG. 12).

Figure 16:
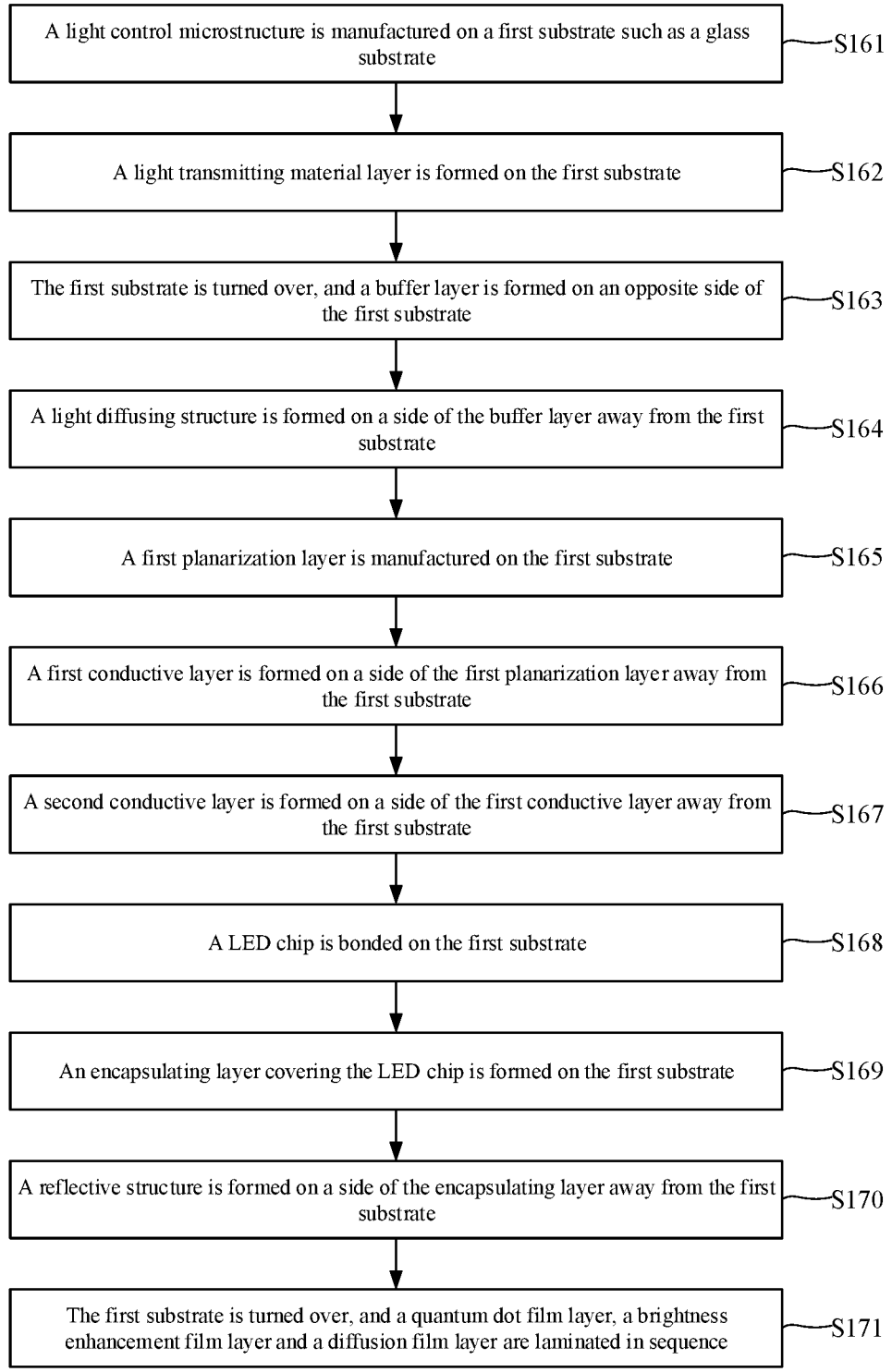
FIG. 16 is a flowchart of a method for manufacturing the backlight module shown in FIG. 7 according to some exemplary embodiments of the present disclosure.

FIG. 16 is a flowchart of a method for manufacturing the backlight module shown in FIG. 7 according to some exemplary embodiments of the present disclosure. Referring to FIG. 7 and FIG. 16, the method may be performed according to the following steps.

In step S161, a light control microstructure is manufactured on a first substrate 1 such as a glass substrate, for example, a plurality of light reflecting portions 62 are manufactured.

Specifically, the light reflecting portion 62 may be formed of a single metal such as Ag, Al, and AlNd, etc., or a composite metal such as ITO/Ag/ITO, etc. A layer of a metal material layer may be deposited on the first substrate 1, and then a plurality of light reflecting portions 62 may be formed through a patterning process.

In step S162, a light transmitting material layer is formed on the first substrate 1. The light transmitting material layer may be filled between every two adjacent light reflecting parts 62, and optionally, the light transmitting material layer may also cover the light reflecting portions 62. A light transmitting portion 61 is formed of a light transmitting material filled between every two adjacent light reflecting portions 62.

For example, the light transmitting material layer may be formed of an inorganic material such as silicon nitride, silicon oxide, etc., or an organic polymer, and a thickness of the light transmitting material layer may be in a range of 1000 to 3000 angstroms.

In step S163, the first substrate 1 is turned over, and a buffer layer 3 is formed on an opposite side of the first substrate 1. The buffer layer 3 may be used to adjust a stress and ensure a surface flatness of the first substrate 1.

In step S164, a light diffusing structure 8 is formed on a side of the buffer layer 3 away from the first substrate 1.

Specifically, a transparent organic material such as a transparent resin may be used to manufacture the light diffusing structure 8. Through a proximity effect of light, the transparent organic material is manufactured into a prismatic structure. The number of the prismatic structures may be single or multiple.

In step S165, a first planarization layer 4 is manufactured on the first substrate 1.

For example, the first planarization layer 4 covering the light diffusing structure 8 may be formed by leveling of the transparent organic material. A refractive index of the material of the first planarization layer 4 is greater than a refractive index of the material of the light diffusing structure 8. For example, the refractive index of the material of the first planarization layer 4 may be about 1.55 to 1.65, and the refractive index of the material of the light diffusing structure 8 may be about 1.2.

In step S166, a first conductive layer 5 is formed on a side of the first planarization layer 4 away from the first substrate 1.

For example, the first conductive layer 5 may be formed through a sputtering process or an electroplating process by using a metal such as Cu, and a thickness of the first conductive layer may be in a range of 2 to 10 μm. Then, a plurality of wirings may be formed by patterning the first conductive layer through a patterning process.

Optionally, after the above-mentioned wirings are formed, a cover layer 11 may be formed. For example, the cover layer 11 may be made of silicon nitride with a thickness of about 100 nm, and then filled and cured with resin. Alternatively, direct filling with a low temperature organic material may be employed.

In step S167, a second conductive layer 9 is formed on a side of the first conductive layer 5 away from the first substrate 1.

For example, the second conductive layer 9 may be formed through a sputtering process or an electroplating process by using a metal such as Cu, and a thickness of the second conductive layer may be smaller than the thickness of the first conductive layer. Then, a plurality of wirings may be formed by patterning the second conductive layer through a patterning process.

In step S168, a LED chip 2 is bonded on the first substrate 1.

For example, the LED chip 2 may be bonded to the first substrate 1 through picking and placing, so that each electrode of the LED chip 2 is electrically connected to each wiring on the first substrate 1.

In step S169, an encapsulating layer 12 covering the LED chip 2 is formed on the first substrate 1.

For example, an encapsulant may be coated on a side of the LED chip 2 away from the first substrate 1, and the encapsulation layer 12 may be formed after drying. The encapsulant may include a transparent light-curable or heat-curable resin, such as silica gel, etc.

In step S170, a reflective structure 13 is formed on a side of the encapsulating layer 12 away from the first substrate 1.

For example, the reflective structure 13 may be a laminated structure of ITO/Ag/ITO, or a commercially available reflective film.

In step S171, the first substrate 1 is turned over, and a quantum dot film layer 14, a brightness enhancement film layer 15 and a diffusion film layer 16 are laminated in sequence.

Figure 17:
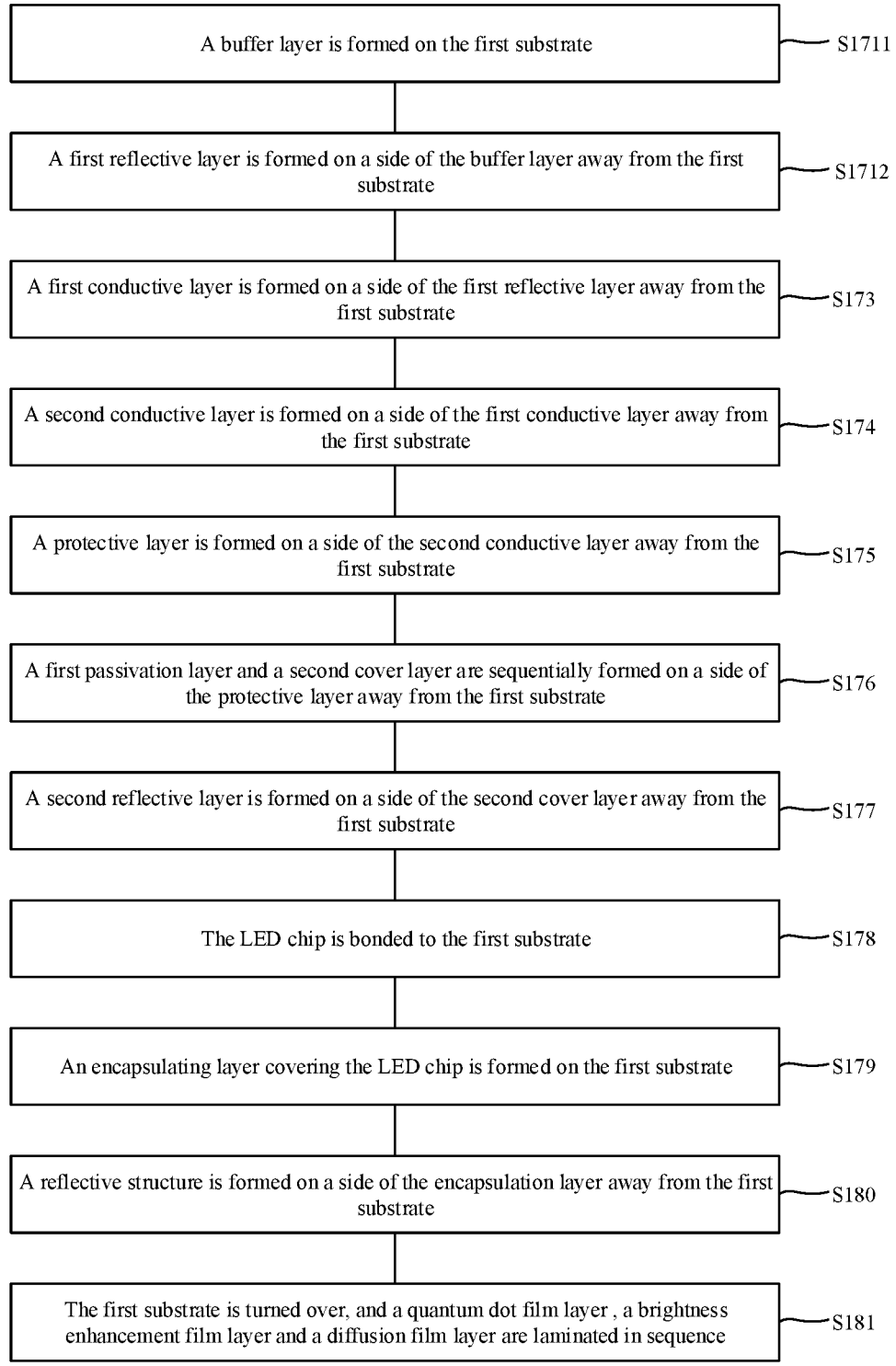
FIG. 17 is a flowchart of a method for manufacturing the backlight module shown in FIG. 9 according to some exemplary embodiments of the present disclosure.

FIG. 17 is a flowchart of a method for manufacturing the backlight module shown in FIG. 9 according to some exemplary embodiments of the present disclosure. Referring to FIG. 9 and FIG. 17, the method may be performed according to the following steps.

In step S1711, a buffer layer 3 is formed on the first substrate 1. The buffer layer 3 may be used to adjust a stress and ensure a surface flatness of the first substrate 1.

In step S1712, a first reflective layer 20 is formed on a side of the buffer layer 3 away from the first substrate 1.

For example, the first reflective layer 20 may be formed of a single metal such as Ag, Al, AlNd (aluminum neodymium), etc., or a composite metal such as ITO/Ag/ITO, etc. A layer of a metal material may be deposited on the first substrate 1, and then the first reflective layer 20 may be formed through a patterning process.

Optionally, a second passivation layer 26 may be formed on a side of the first reflective layer 20 away from the first substrate 1. For example, the second passivation layer 26 may be formed of an inorganic material such as silicon nitride or silicon oxide, etc., or an organic polymer material, and a thickness of the second passivation layer is 1000~3000 angstroms.

In step S173, a first conductive layer 5 is formed on a side of the first reflective layer 20 away from the first substrate 1.

For example, the first conductive layer 5 may be formed through a sputtering process or an electroplating process by using a metal such as Cu, and a thickness of the first conductive layer may be in a range of 2 to 10 µm. Then, a plurality of wirings may be formed by patterning the first conductive layer through a patterning process.

Optionally, after the above-mentioned wirings are formed, a first cover layer 21 may be formed. For example, the first cover layer 21 may be made of silicon nitride with a thickness of about 100 nanometers, and then filled and cured with resin. Alternatively, direct filling with a low temperature organic material may be employed.

In step S174, a second conductive layer 9 is formed on a side of the first conductive layer 5 away from the first substrate 1.

For example, the second conductive layer 9 may be formed through a sputtering process or an electroplating process by using a metal such as Cu, and a thickness of the second conductive layer may be smaller than the thickness of the first conductive layer, for example, in a range of 0.5 to 1 µm. Then, a plurality of wirings may be formed by patterning the second conductive layer through a patterning process.

In step S175, a protective layer 22 is formed on a side of the second conductive layer 9 away from the first substrate 1.

For example, the protective layer 22 may be formed of a conductive material such as ITO, with a thickness of 500 to 1500 angstroms.

In step S176, a first passivation layer 23 and a second cover layer 24 are sequentially formed on a side of the protective layer 22 away from the first substrate 1.

The first passivation layer 23 may be formed of a material such as silicon nitride, silicon oxide, silicon oxynitride, etc., and a thickness of the first passivation layer is in a range of 1000 to 3000 angstroms.

The second cover layer 24 may be directly leveled by using an organic material, an optional material may include resin, polyimide-based material, and acrylic-based material. In order to prevent copper from being oxidized, a low temperature process technology may be used with a temperature of, for example, less than 150° C.

In step S177, a second reflective layer 25 is formed on a side of the second cover layer 24 away from the first substrate 1.

In step S178, the LED chip 2 is bonded to the first substrate 1.

For example, the LED chip 2 may be bonded to the first substrate 1 through picking and placing, so that each electrode of the LED chip 2 is electrically connected to each wiring on the first substrate 1.

In step S179, an encapsulating layer 12 covering the LED chip 2 is formed on the first substrate 1.

For example, an encapsulant may be coated on a side of the LED chip 2 away from the first substrate 1, and the encapsulating layer 12 may be formed after drying. The encapsulant may include a transparent light-curable or heat-curable resin, such as silica gel, etc.

In step S180, a reflective structure 13 is formed on a side of the encapsulation layer 12 away from the first substrate 1.

For example, the reflective structure 13 may be a laminated structure of ITO/Ag/ITO, or a commercially available reflective film.

In step S181, the first substrate 1 is turned over, and a quantum dot film layer 14, a brightness enhancement film layer 15 and a diffusion film layer 16 are laminated in sequence.

In the method of the embodiment of the present disclosure, in addition to the advantages and the effects of the above-mentioned embodiments, the number of turns of the first substrate 1 may also be reduced, which is beneficial to realize a manufacturing process of large-sized products.

It should be noted that, some steps of the above-mentioned method may be performed individually or in combination, and may be performed in parallel or sequentially, and are not limited to the specific operating sequence shown in the drawings.

Figure 18:
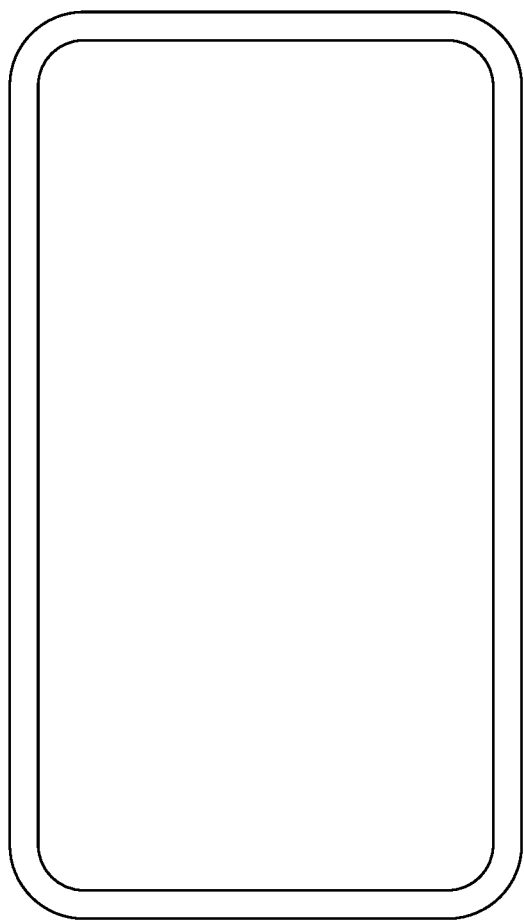
FIG. 18 is a schematic diagram of a display device according to some exemplary embodiments of the present disclosure.

Some exemplary embodiments of the present disclosure also provide a display device. FIG. 18 is a schematic diagram of a display device according to some exemplary embodiments of the present disclosure. Referring to FIG. 18, the display device includes the above-mentioned backlight module.

The display device may be any product or component with a display function. For example, the display device may be a smart phone, a portable phone, a navigation apparatus, a television (TV), a car audio body, a laptop computer, a tablet computer, a portable multimedia player (PMP), a personal digital assistant (PDA), etc.

It should be understood that the display device according to some exemplary embodiments of the present disclosure has all the features and advantages of the above-mentioned backlight module, for the features and advantages, reference may be made to the above descriptions of the light emitting substrate, and will not be repeated here.

As used herein, the terms "substantially," "approximately," "about," and other similar terms are used as terms of approximation rather than as terms of degree, and are intended to explain an inherent deviation of a measured or calculated value that would be recognized by one of ordinary skill in the art. Taking into account factors such as process fluctuations, measurement problems, and errors associated with the measurement of specific quantities (i.e., limitations of a measurement system), "about" or "approximately" as used herein includes the stated value and is intended to mean a specific value determined by one of ordinary skill in the art is within an acceptable tolerance. For example, "about" may mean within one or more standard deviations, or within ±10% or ±5% of the stated value.

Although some embodiments in accordance with the present general inventive concept have been illustrated and described, those of ordinary skill in the art will appreciate that changes may be made to these embodiments without departing from the principle and the spirit of the present general inventive concept, and the scope of the present disclosure is defined by the claims and their equivalents.

What is claimed is:

1. A backlight module, comprising:
   a first substrate;
   a plurality of light emitting diode chips on the first substrate, wherein the plurality of light emitting diode chips are arranged on the first substrate in an array in a first direction and a second direction;
   a light control structure on the first substrate, wherein the light control structure is configured to: receive light emitted from the light emitting diode chips, and control a light flux distribution of light emitted from the light control structure;
   a first conductive layer on the first substrate, wherein the first conductive layer comprises a plurality of first wirings;
   a second conductive layer on a side of the first conductive layer away from the first substrate, wherein the second conductive layer comprises a plurality of second wirings; and
   a first cover layer on the first substrate, wherein the first cover layer is formed of a light transmitting material, and the first cover layer is configured to fill at least gaps among the plurality of first wirings,
   wherein the backlight module comprises a plurality of light control region groups, the plurality of light control region groups are in one-to-one correspondence with the plurality of light emitting diode chips, each light control region group comprises at least a first light control region and a second light control region, an orthographic projection of the first light control region of each light control region group on the first substrate covers an orthographic projection of the light emitting diode chip corresponding to the light control region group on the first substrate, an orthographic projection of the second light control region of the each light control region group on the first substrate encloses the orthographic projection of the first light control region of the light control region group on the first substrate;
   wherein the light control structure comprises a plurality of light control substructure groups, the plurality of light control substructure groups are respectively located in the plurality of light control region groups, and each light control substructure group comprises at least a first light control substructure and a second light control substructure;
   wherein each of the light control substructures comprises a plurality of light transmitting portions and a plurality of light reflecting portions, and a proportion of the light transmitting portions in the first light control substructure is different from a proportion of the light transmitting portions in the second light control substructure; and
   wherein the plurality of light reflecting portions of the light control structure comprises the plurality of first wirings and the plurality of second wirings, and the plurality of light transmitting portions of the light control structure comprise parts of the first cover layer in the gaps among the plurality of first wirings.

2. The backlight module according to claim 1, wherein the first light control substructure is located in the first light control region, the second light control substructure is located in the second light control region, and a proportion of the light transmitting portions in the first light control substructure is less than a proportion of the light transmitting portions in the second light control substructure.

3. The backlight module according to claim 1, wherein the plurality of light transmitting portions and the plurality of light reflecting portions of the light control structure are arranged alternately.

4. The backlight module according to claim 3, wherein the light control structure comprises a light reflecting layer formed of a reflective material and a plurality of hollow portions formed in the light reflecting layer, the plurality of hollow portions are configured as the plurality of light transmitting portions, and parts of the light reflecting layer between every two adjacent hollow portions are configured as the plurality of light reflecting portions; or
   wherein the plurality of light reflecting portions of the light control structure are arranged in an array in the first direction and the second direction, the light control structure comprises a transparent material layer filled between every two adjacent light reflecting portions and covering the plurality of light reflecting portions, and parts of the transparent material layer between every two adjacent light reflecting portions are configured as the plurality of light transmitting portions.

5. The backlight module according to claim 1, wherein each light control region group further comprises a third light control region, and an orthographic projection of the third light control region of each light control region group encloses the orthographic projection of the second light control region of the light control region group on the first substrate;
   wherein each light control substructure group further comprises a third light control substructure, and the third light control substructure is located in the third light control region;
   wherein the third light control substructure further comprises a plurality of light transmitting portions and a plurality of light reflecting portions, a proportion of the light transmitting portions in the third light control substructure, the proportion of the light transmitting portions in the second light control substructure and the proportion of the light transmitting portions in the first light control substructure are different from each other.

6. The backlight module according to claim 5, wherein each light control region group further comprises a fourth light control region, and an orthographic projection of the fourth light control region of each light control region group on the first substrate encloses the orthographic projection of the third light control region of the light control region group on the first substrate;

wherein each light control substructure group further comprises a fourth light control substructure, and the fourth light control substructure is located in the fourth light control region;

wherein the fourth light control substructure further comprises a plurality of light transmitting portions and a plurality of light reflecting portions, a proportion of the light transmitting portions in the fourth light control substructure, the proportion of the light transmitting portions in the third light control substructure, the proportion of the light transmitting portions in the second light control substructure and the proportion of the light transmitting portions in the first light control substructure are all different from each other.

7. The backlight module according to claim 1, wherein each light control region group comprises N light control regions, and N is a positive integer greater than or equal to 2;

wherein the N light control regions comprise at least the first light control region and the second light control region, and an orthographic projection of a $N_{th}$ light control region of each light control region group on the first substrate encloses an orthographic projection of a $N-1_{th}$ light control region of the light control region group on the first substrate.

8. The backlight module according to claim 1, further comprises a plurality of light diffusing structures on the first substrate, wherein orthographic projections of the plurality of light diffusing structures on the first substrate respectively cover orthographic projections of the plurality of light emitting diode chips on the first substrate, and the light diffusing structure is configured to diffuse the light emitted from the light emitting diode chip.

9. The backlight module according to claim 8, wherein each light diffusing structure comprises a plurality of triangular prisms, each triangular prism has an apex angle and an edge opposite to the apex angle, the edge of the triangular prism is located on a side of the triangular prism close to the first substrate, and the apex angle is located on a side of the triangular prism away from the first substrate.

10. The backlight module according to claim 9, further comprising a first planarization layer on the first substrate, wherein the first planarization layer covers the plurality of triangular prisms, and a refractive index of a material of the first planarization layer is greater than a refractive index of a material of the light diffusing structure.

11. The backlight module according to claim 8, wherein the first substrate comprises a first side and a second side opposite to the first side, and the plurality of light emitting diode chips and the light control structure are respectively located on the first side and the second side of the first substrate;

wherein the plurality of light diffusing structures are disposed on the first side of the first substrate and between the first substrate and the plurality of light emitting diode chips.

12. The backlight module according to claim 1, wherein the first substrate comprises a first side and a second side opposite to the first side, and each of the plurality of light emitting diode chips and the light control structure is located on the first side of the first substrate;

wherein the backlight module further comprises a first reflective layer on the first substrate, and the first reflective layer is disposed between the first conductive layer and the first substrate;

wherein an orthographic projection of the first reflective layer on the first substrate covers an orthographic projection of the first wirings on the first substrate, and the orthographic projection of the first reflective layer on the first substrate further covers an orthographic projection of the second wirings on the first substrate.

13. The backlight module according to claim 12, further comprising an encapsulating layer and a reflective structure, wherein the encapsulating layer is disposed on the first substrate and covers the plurality of light emitting diode chips, the reflective structure is located on a side of the encapsulating layer away from the first substrate, and an orthographic projection of the reflective structure on the first substrate at least covers an orthographic projection of the plurality of light emitting diode chips on the first substrate.

14. The backlight module according to claim 13, wherein the reflective structure comprises a plurality of lenses, the plurality of lenses are arranged on the first substrate in an array, and each lens is protruded in a direction away from the first substrate, or wherein the reflective structure comprises a groove portion, and an orthographic projection of the groove portion on the first substrate at least partially overlaps with the orthographic projection of the plurality of light emitting diode chips on the first substrate, and the groove portion is recessed in a direction toward the light emitting diode chips.

15. The backlight module according to claim 12, further comprising an encapsulating layer and a reflective structure, wherein the encapsulating layer is disposed on the first substrate and covers the plurality of light emitting diode chips, the reflective structure is located on the second side of the first substrate, and an orthographic projection of the reflective structure on the first substrate at least covers an orthographic projection of the plurality of light emitting diode chips on the first substrate.

16. A display device, comprising the backlight module according to claim 1.

* * * * *